US 11,183,078 B2

(12) United States Patent
Thysell

(10) Patent No.: US 11,183,078 B2
(45) Date of Patent: Nov. 23, 2021

(54) MEAL PREPARATION ORCHESTRATOR

(71) Applicant: Mixator AB, Huddinge (SE)

(72) Inventor: Michael Thysell, Hudding (SE)

(73) Assignee: Mixator AB, Huddinge (SE)

( * ) Notice: Subject to any disclaimer, the term of this patent is extended or adjusted under 35 U.S.C. 154(b) by 323 days.

(21) Appl. No.: 16/567,936

(22) Filed: Sep. 11, 2019

(65) Prior Publication Data

US 2020/0005669 A1   Jan. 2, 2020

Related U.S. Application Data

(63) Continuation-in-part of application No. 15/713,902, filed on Sep. 25, 2017, now abandoned.

(51) Int. Cl.
| | | |
|---|---|---|
| *G06F 16/00* | (2019.01) | |
| *G09B 19/00* | (2006.01) | |
| *G06F 16/245* | (2019.01) | |

(52) U.S. Cl.
CPC ......... *G09B 19/003* (2013.01); *G06F 16/245* (2019.01)

(58) Field of Classification Search
None
See application file for complete search history.

(56) References Cited

U.S. PATENT DOCUMENTS

| | | | |
|---|---|---|---|
| 6,381,614 B1* | 4/2002 | Barnett | G06F 16/338 |
| 6,789,067 B1* | 9/2004 | Liebenow | G06Q 10/087 |
| | | | 705/15 |
| 2011/0289044 A1 | 11/2011 | Harrison | |
| 2012/0136751 A1 | 5/2012 | Ochtel | |
| 2013/0007615 A1 | 1/2013 | Goldman | |
| 2013/0185646 A1 | 7/2013 | Wiggins | |
| 2015/0161748 A1* | 6/2015 | Ratakonda | G06Q 10/063 |
| | | | 705/15 |
| 2016/0098465 A1 | 4/2016 | Wu et al. | |

FOREIGN PATENT DOCUMENTS

| | | |
|---|---|---|
| WO | 2007051049 | 5/2007 |
| WO | 2014146102 | 11/2014 |

* cited by examiner

*Primary Examiner* — Anhtai V Tran
(74) *Attorney, Agent, or Firm* — Fasth Law Offices; Rolf Fasth

(57) ABSTRACT

Control unit (110) and method (400) for assisting a user in orchestrating preparation of a meal comprising a plurality of dishes, based on recipes (160, 170) stored in a database (120) on a common recipe format, by independent recipe authors (130, 140). The method (400) comprises offering (401) dishes to a user, which correspond to a respective recipe (160, 170) in the database (120); receiving (402) a selection of dishes from the user; determining (403) a required work intensity of the user, for each recipe step; determining (404) a maximum time limit of each step of the respective recipes (160, 170); composing (406) a time interval structure of the steps of the respective recipes (160, 170), based on the required work intensity and the maximum time limit of each step; and outputting (409) the composed (406) time interval structure to the user.

10 Claims, 9 Drawing Sheets

☐ Work intensity 0%  ▨ Work intensity 50%  ▦ Work intensity 100%

MEAL PREPARATION ORCHESTRATOR

PRIOR APPLICATION

This is a continuation-in-part patent application that claims priority from U.S. patent application Ser. No. 15/713,902, filed 25 Sep. 2017 that claims priority from Swedish patent application no. 1600281-8, filed 7 Oct. 2016.

TECHNICAL FIELD

Implementations described herein generally relate to a control unit and a method. More particularly, a method and a control unit are described, for assisting a user in orchestrating preparation of a meal comprising a plurality of dishes, based on recipes stored in a database on a common recipe format, by independent recipe authors.

BACKGROUND

Recipes for various dishes may be available on an electronic format, e.g. accessible via internet or an app and typically provide information concerning which ingredients to utilise, which quantities to apply, and instructions concerning the dish preparation.

However, these recipes on the electronic format have not evolved much beyond the classical concept of recipes provided in paper format, i.e. the user has to read a lot of text in order to utilise the recipe and understand which utensils and ingredients to use, and the preparation order of the various moments and the possible advantages of digital recipes are yet not exploited fully.

Further, when preparing a meal, typically a plurality of dishes has to be cooked and thus also a plurality of recipes has to be used simultaneously. However, there is in general no advice provided to the user, how to combine the different work moments of the different recipes in order to get the different dishes ready at the same time and/or in the shortest possible time, except possibly in the very specific case when one chef/author has written a specific recipe including several dishes to be composed into one meal without possibility for the user to alter any of the dishes due to personal taste, allergy or similar.

Thus, there may exist recipes for complete meals wherein the preparation order is set and organised by the chef/author, but in case the user would like to compose a meal out of dishes/recipes written by distinct authors, the user has to figure out him/herself in which order to make the different method steps of the respective recipes in order to be ready at dinner time and/or as quickly as possible.

Normally, there is no possibility for the chef/author of a recipe to specify how long time the dish may be made in advance before deteriorating, other than plain text within the recipe. When preparing a plurality of dishes for a meal, it may often be necessary, in particular when two or more dishes require the same resource and/or the user's complete attention, to prepare the dishes sequentially and the inexperienced user may not know which dish to start prepare and then leave to rest while preparing the other dish/-es; and for how long time it may rest before deteriorating.

The user, although possibly inexperienced in cooking and/or having problems reading recipes may yet have developed a progressive or unconventional taste; and/or have an opened and experimental mindset and for example be willing to exchange the customary boiled potatoes of a Scandinavian meal such as meatballs with lingonberry jam, with an exotic vegetable such as e.g. cooking plantain, yams and/or cassava. It is then far from obvious for the typical user how to prepare the exotic vegetable, how to organise various cocking moments of the vegetable in combination with the preparation of the meatballs and/or how long time in advance the dish may be cooked/kept warm before losing its freshness, for example. It is also a very small probability that the user finds a readymade meal preparation made by a chef/author in this kind of daring food combinations.

The user may further be interested in preparing a certain set of dishes when inviting his/her friends; however due to various allergies, diets, phobias, etc. among the guests, he/she may have to prepare alternative replacement dishes comprising edibles with which he/she is not very accustomed. Further, the thereby increased number of dishes creates increased problems for the user concerning how to organise the food preparation, in which order to perform the various steps of the respective recipes; and to determine how to handle conflicts in resource utilisation when preparing different dishes; several dishes may require preparation in the oven at different temperatures and length, for example.

In case the user makes a search for recipes on the internet, or a particular recipe provider via internet, in order to discover and combine different recipes into a meal, the user most likely will be obliged to read a substantial amount of texts and him/herself combine the various recipe steps into a working list; which is problematic not only for the dyslectic user (often estimated to about 5-8% of the Swedish population); the reader with reading disability (the reading ability of Swedish students is considerably lower than the OECD average, according to the PISA study 2012), see https://sv.wikipedia.org/wiki/Pisa_(utbildningsstudie); or people with age-related alteration of the eye lens, who are required to firstly retrieve their reading glasses before preparing any action; but most likely for any user as cooking typically involve wet/sticky fingers, which combines badly with a computer/touchscreen communication interface and the requirement of text scrolling and recipe swapping.

It would be desired to provide the inexperienced kitchen user with a tool, enabling him/her to prepare a time planned meal with a flexibility to use recipes of choice beyond what is currently found in plain text recipes or today available tools on the market.

SUMMARY

It is therefore an object to obviate at least some of the above mentioned disadvantages and to provide assistance to a user when preparing a meal.

This and other objects are achieved by the features of the appended independent claims. Further implementation forms are apparent from the dependent claims, the description and the figures.

According to a first aspect, a control unit is provided. The control unit aims at assisting a user in orchestrating preparation of a meal comprising a plurality of dishes, based on recipes stored in a database on a common recipe format, by independent recipe authors. The control unit is configured to offer a plurality of dishes to the user via a user device, where each dish corresponds to a respective recipe in the database. Further, the control unit is configured to receive a selection of dishes forming the meal, made by the user, via a communication interface. The control unit is in addition configured to determine a required work intensity for/from the user, for each recipe step in a respective recipe associated with the received dish selection, based on information provided by the recipe author. The control unit is also configured to determine a maximum time limit of each recipe step of the respective recipe, based on information provided by the recipe author. Furthermore, the control unit is additionally configured to compose a time interval structure of the recipe steps of the respective recipe, based on the determined required work intensity for/from the user for each recipe step and the determined maximum time limit of each recipe step. The control unit is configured to generate control signals to output the composed time interval structure to the user device of the user.

According to a second aspect, a method is provided. The method aims at assisting a user in orchestrating preparation of a meal comprising a plurality of dishes, based on recipes stored in a database on a common recipe format, by independent recipe authors. The method comprises offering a plurality of dishes to the user via a user device, where each dish corresponds to a respective recipe in the database. Further, the method also comprises receiving a selection of dishes forming the meal, made by the user. The method additionally comprises determining a required work intensity for/from the user, for each recipe step in a respective recipe associated with the received dish selection, based on information provided by the recipe author. Furthermore, the method comprises determining a completion time interval of each recipe step of the respective recipe, based on information provided by the recipe author. In further addition the method also comprises composing a time interval structure of the various recipe steps of the respective recipe, based on the determined required work intensity of the user for each recipe step and the determined maximum time limit of each recipe step. The method comprises outputting the composed time interval structure of the steps to the user device of the user.

By using a common recipe format for all recipes which are uploaded and stored on the database, a platform is provided for offering the user a variety of dishes, which may be provided by different recipe authors; which dishes may be combined into a meal, as selected by the user. As the common recipe format requires certain parameters which the recipe author has to specify, such as required work intensity of the user and a completion time interval for each step in the respective recipe, the control unit is enabled to combine the various recipes of distinct dishes into a time interval structure, for assisting and coaching the user when preparing the meal. By preparing the time interval structure of the steps based on the required work intensity of the user and the maximum time limit of each recipe step, it becomes possible for the control unit to optimise the total cooking time and also prepare the meal without any edible becoming deteriorated at the moment of the meal.

In some embodiments, input values may be collected by the control unit, where after the time interval structure of the recipe steps may be adapted to received input values continuously. The time interval structure may thereby be adapted due to various unexpected events occurring the user during the cooking process, such as received phone calls and various other interruptions.

Thanks to the provided solution, it becomes possible also for the inexperienced user to compose a complex meal comprising various dishes from distinct recipe authors, also when made with edibles from which the user has none or negligible previous cooking experience. Thereby a tool is provided for the inexperienced user to prepare a meal to a predetermined serving time using an arbitrary selection of recipes.

In one embodiment of the method of the present invention of cooking a meal, the method comprises the step of providing a cooking device in wireless communication with a control unit. The cooking device is in wireless communication with the control unit. The control unit is in communication with a database, a comparison unit and a communication device. A first cooking recipe is stored in a first format in the database. The first format contains a resource segment, a cooking step or task segment. Each cooking step segment contains a work intensity, a minimum time, a base time and a maximum time. The base time is the same or longer than the minimum time and the same or shorter than the maximum time. The first cooking recipe requires a first resource and at least a first cooking step and a second cooking step. A second cooking recipe is stored in the first format in the database. The second cooking recipe requires a second resource and at least a first cooking step and a second cooking step. The first and second cooking recipes are part of the meal. The communication device sends a request signal to the control unit. The request signal contains a request to plan the meal requiring at least the first cooking recipe and the second cooking recipe and a completion time of the meal. The control unit sends a retrieve signal to the database to retrieve the first cooking recipe and the second cooking recipe. The control unit sends a retrieve signal to the communication device to retrieve a completion time of the meal. The control unit adds up the base times of the first cooking step and the second cooking step of the first cooking recipe to determine a first total time required to complete the first cooking recipe. The control unit adds up the base times of the first cooking step and the second cooking step of the second cooking recipe to determine a second total time required to complete the second cooking recipe. The control unit determines a starting time based on the first total time, the second total time and the completion time. The control unit adds up the work intensity of timewise overlapping cooking steps from the first recipe and the second recipe to a combined work intensity for preparing the meal.

When the first combined work intensity for the first cooking step of the first recipe and the first cooking step of the second recipe exceeds 100%, the control unit sends a comparison signal to the comparison unit to compare the starting times of the first cooking step of the first recipe with the first cooking step of the second recipe and selects the first cooking step with an earliest starting time and the first cooking step with a latest starting time. The comparison unit sends a control signal to the control unit to advance the completion time of the recipe with the earliest first cooking step and to delay the starting time of the first cooking step with the latest starting time. The control unit iteratively advances the completion time of the first cooking step with the earliest starting time by reducing the base time for this cooking step and increases the base time for the second cooking step of the selected recipe and delays the starting time of the first cooking step with the latest starting time by reducing the base times of this cooking step and the second cooking step for this recipe until the combined work intensity no longer exceeds 100%. When the first combined work intensity for the first cooking step of the first recipe and the first cooking step of the second recipe exceeds 100% and all minimum time limits and all maximum time limits are reached, the control unit sends a message to the communication unit to choose a new combination of recipes for the meal. When the combined work intensity remains at a maximum 100% from the starting time to the completion time, the control unit composes a time interval structure of the steps in the respective recipes based on the optimized cooking schedule to prioritize the cooking steps that have a lowest least work intensity when two or more cooking steps are scheduled to start at the same time. The control unit generates and transmits control signals to the communication device of the user or to a cooking device for outputting the composed time interval structure on the cooking device. The control unit receives at least one input value from a sensor or from the communication device. The control unit composes an adapted time interval structure of the steps with regard to the received input value. The control unit generates and transmits control signals to the communication device and/or to a cooking device for outputting the adapted time interval structure on the communication device and/or the cooking device.

In an alternative embodiment, the method further comprises the step of the control unit sending a comparison signal to the comparison unit to compare the work intensity of the second cooking step of the first cooking recipe with the first cooking step of the second cooking recipe. The control unit sends an instruction signal to the communication device to start the second cooking step of the first cooking recipe before the first cooking step of the second cooking recipe when the second cooking step of the first cooking recipe has a work intensity lower than the work intensity of the first cooking step of the second cooking recipe.

In yet another embodiment, the method further comprises the step of providing a sensor on the cooking device. The sensor senses a temperature on the cooking device. The sensor sends a temperature signal to the control unit when the temperature approaches, reach or exceeds a threshold value.

In another embodiment of the present invention, the method further comprises the step of the control unit receiving the temperature signal at a first time and comparing the first time to a reference time on a countdown timeline, the control unit sending a warning signal to the communication device when the first time is later than the reference time.

In an alternative embodiment, the method further comprises the step of the control unit receiving the temperature signal at a first time and comparing the first time to a reference time for completing a cooking step and sending a warning signal to the communication device when the first time exceeds a maximum time set for the cooking step.

In another embodiment, the method further comprises the step of starting a cooking step of the first cooking recipe before a cooking step of the second cooking recipe when the cooking step of the first cooking recipe has a work intensity that is lower than the work intensity of the cooking step of the second cooking recipe.

In yet another embodiment, the method further comprises the step of the sensor sending information signals directly to the communication device.

In another embodiment, the method further comprises the step of the control unit comparing resources required for the first cooking recipe with the resources required for the second cooking recipe, further identifying and resolving a conflict in resource utilization.

In yet another embodiment, the method further comprises the step of the control unit adjusting an permitted preparation time of cooking steps so that the first and second cooking recipes are completed at the same time.

In another embodiment, the method further comprises the step of the control unit displaying each subsequent cooking step of the first and second cooking recipe along the countdown timeline so that the third cooking step of the first cooking recipe and the third cooking step of the second cooking recipe are simultaneously completed.

Other objects, advantages and novel features of the described aspects will become apparent from the following detailed description.

BRIEF DESCRIPTION OF THE DRAWINGS

Various embodiments are described in more detail with reference to attached drawings, illustrating examples in which.

DETAILED DESCRIPTION

Embodiments of the invention described herein are defined as a control unit and a method, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
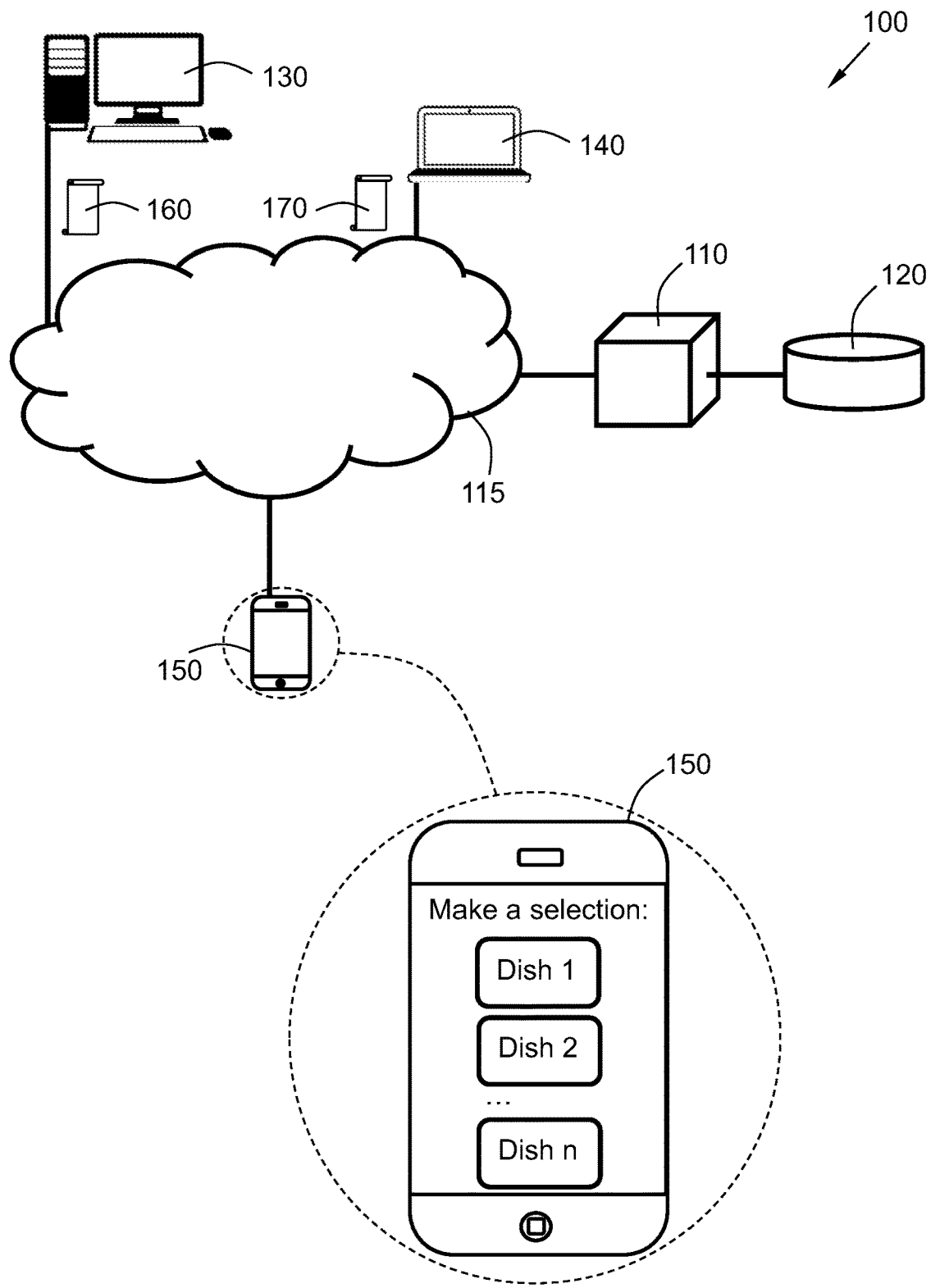
FIG. 1A is a block diagram illustrating a system according to an embodiment of the invention.

FIG. 1A is a schematic illustration over a system 100. The system 100 comprises a control unit 110 for assisting a user in orchestrating preparation of a meal comprising a plurality of dishes. The control unit 110 is connected to a database 120, wherein recipes 160, 170 of dishes may be stored. These recipes 160, 170 may be uploaded to the database 120 over a communication network 115 by various independent recipe authors 130, 140. This is possible due to provision of a common recipe format, as will be further discussed in conjunction with presentation of FIG. 2. The database 120 may store a large number of recipes 160, 170.

As utilised herein; a recipe 160, 170 comprises instructions how to complete one dish, which consists of one or several work steps in a given work order. A dish is a part of a meal, which dish is corresponding to one recipe 160, 170. A meal is a combination of one or several dishes forming the meal. A work step, or recipe step, is an instruction for completing a discrete part of a recipe 160, 170. Work order is the order in time in which the work steps are to be completed to successfully cook the recipe 160, 170. A time interval is the determined time period for completing each work step where the minimum time limit is given to complete the step and the maximum time limit is given to prevent that the involved edibles become deteriorated. A time interval structure is the combination of time intervals from several recipes 160, 170 that are to be prepared simultaneously. The common recipe format of the recipes 160, 170, is the format in which each work step is described with respect to time, resource and work intensity in such a way that the completion time for each work step may be altered within a given time interval to optimise the total cooking effort when preparing a meal consisting of several dishes that are to be prepared simultaneously to form a complete meal served at a predetermined time.

A user may via a communication device 150 access the recipes 160, 170 in the database 120 over the communication network 115, e.g. presented on a web page or any other similar communication interface. The communication may be wired or wireless in different embodiments.

The user may be presented various dishes, for example by presenting images on the web page. In some embodiments, recipes 160, 170 may be searched for in the database 120 on a search engine. Further, recipes 160, 170 may be searched for on the database 120 e.g. by entering desired ingredients, a particular diet or allergy, etc., in some embodiments. Thereby, the user is enabled to select dishes to be combined to a meal.

The communication network 115 may comprise a collection of terminal nodes and/or networks, connected wired or wirelessly, so as to enable telecommunication between the terminals. The communication network 115 may thus comprise a computer network or an internet network.

The control unit 110 may in some embodiments be a server, configured to communicate with the communication device 150, e.g. over the communication network 115. The control unit 110 may also in parallel communicate with a plurality of communication devices 150, depending on capacity of the control unit 110.

However, the control unit 110 may in some embodiments not be connected to the communication network 115, or at least no continuously connected to the communication network 115. In such embodiments, the communication device 150 may be connected to the control unit 110, e.g. via a wired connection or via a short range wireless communication such as e.g. Bluetooth, Near Field Communication (NFC), Radio-Frequency Identification (RFID), Z-wave, ZigBee, IPv6 over Low power Wireless Personal Area Networks (6LoWPAN), Wireless Highway Addressable Remote Transducer (HART) Protocol, Wireless Universal Serial Bus (USB), optical communication such as Infrared Data Association (IrDA) or infrared transmission, etc.

In some further embodiments, the control unit 110 may be integrated in the communication device 150 of the user. In those embodiments, the control unit 110 may uniquely support the particular user of the communication device 150 in food preparation. Thus the control unit 110 may be a software or an app, which may be downloaded into the communication device 150, when a connection over the communication network 115 is at least temporarily available and thereafter operate independently of any network connection.

The communication device 150 of the user in this illustrated embodiment may be represented by a mobile station also known as a mobile device, wireless terminal, mobile telephone, cellular telephone, etc.; a computer tablet, a laptop, a stationary computer, an augmented reality device, a pair of intelligent glasses or lenses, an intelligent watch, a 3D projection device, etc. In some alternative embodiments, the communication device 150 of the user may be integrated into a domestic appliance of the user's kitchen such as a refrigerator, freezer, stove, dishwasher, etc.

Augmented reality is a live direct or indirect view of a physical, real-world environment whose elements are augmented (or supplemented) by computer-generated sensory input such as sound, video or graphics. It is related to a more general concept called mediated reality, in which a view of reality is modified (possibly even diminished rather than augmented) by a computer. As a result, the technology functions by enhancing one's current perception of the reality.

With the help of advanced augmented reality technology (e.g. adding computer vision and object recognition) the information about the surrounding real world of the user becomes visible and possibly interactive. Information about the environment and its objects is overlaid on the real world. This information can be virtual or real, e.g. seeing other real sensed or measured information such as temperature/electromagnetic radio waves overlaid in exact alignment with where they actually are in the kitchen environment, such as the oven, stove, etc.

The communication device 150 is configured for communication over the communication network 115.

The communication device 150 may be configured to receive input from the user via a keyboard, via a touchscreen, via detection of user movements, i.e. a touch-free communication interface, detection and interpretation of voice commands, or similar device for human computer interaction.

Some examples of such touch-free communication interface may be based on e.g. image recognition or gesture recognition of images captured by a camera comprised in the user's communication device 150, in some embodiments. In some other embodiments, eye tracking of either the user's point of gaze (where one is looking) or the motion of an eye relative to the head, may be applied.

In some embodiments, a camera and/or movement sensors integrated with the user's communication device 150, may detect movements of the user in order to enable touch free command input. Voice recognition is another option according to some embodiments.

An obvious advantage with interaction via a touch-free communication interface is that the user can scroll in the text, swap between different recipes 160, 170 etc., also when his/her hands are messy. Further, the keyboard/touchscreen of a typical communication device 150 may not be regularly cleaned and therefore comprise germs and bacteria. By avoiding that the user has to physically touch any keyboard/touchscreen of the communication device 150, it is avoided that bacteria/germs are spread from the communication interface and into the food, which may reduce the risk of food poisoning for the user and his/her meal guests, if any.

The communication device 150 may output information to the user via presentation of text and/or images on a display, sound emitted via loudspeakers, tactile signals emitted by a haptic device integrated in the communication device 150, projection of images, etc.

In some embodiments, the communication device 150 may project a movie and/or an image such as e.g. a 3D image on a wall, fridge or any other similar surface. In some embodiments, a hologram may be created and projected. The movie/image may be outputted by the communication device 150 upon request of the user, or alternatively delivered on command from the control unit 110 when a relevant recipe step is performed.

In some additional embodiments, the communication device 150 may comprise an augmented reality device which may output various advices and information related to the current recipe step, on command from the control unit 110.

Figure 1B:
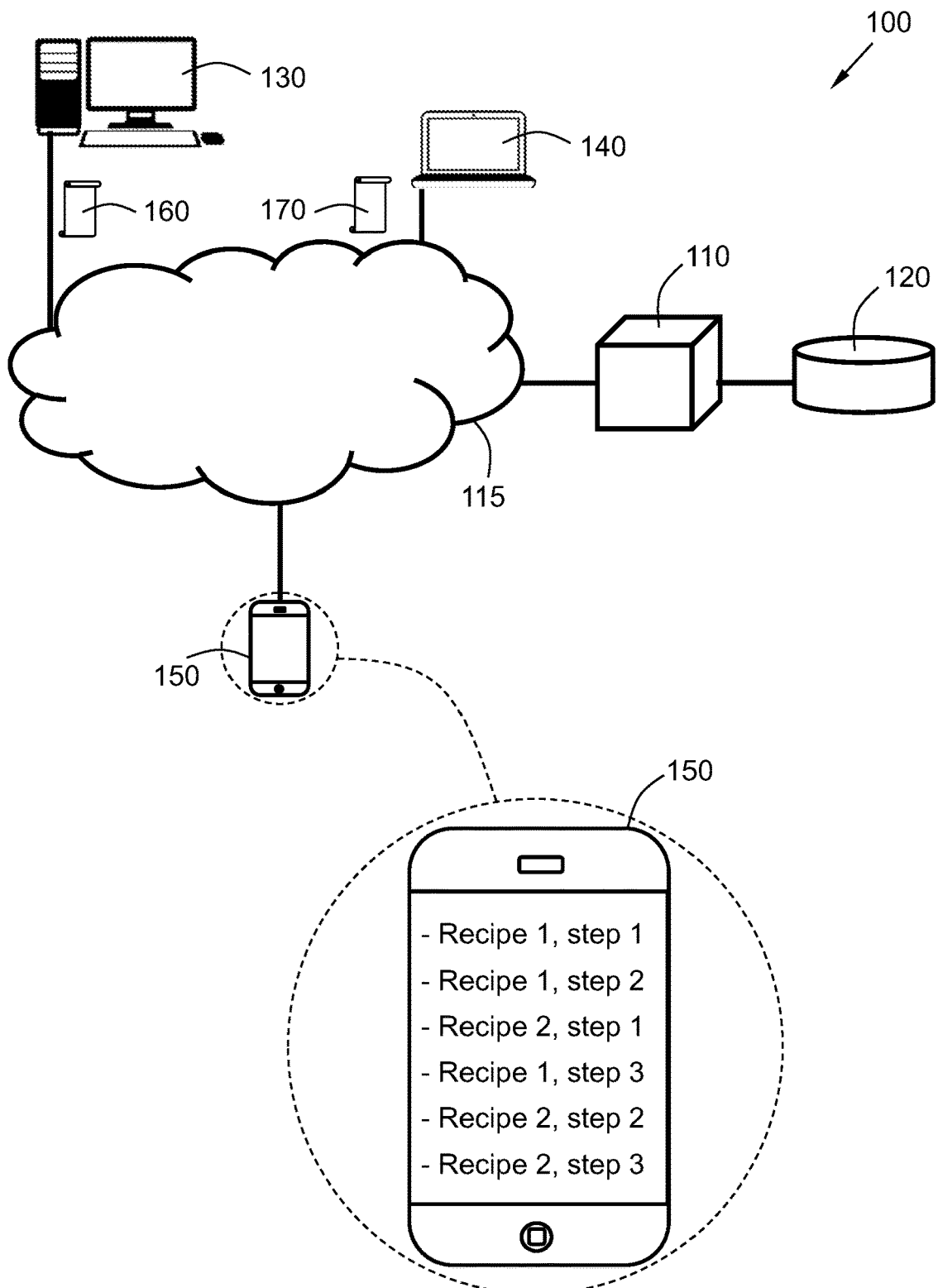
FIG. 1B is a block diagram illustrating a system according to an embodiment of the invention.

FIG. 1B is a schematic illustration over the system 100 illustrated in FIG. 1A, but at a later moment in time where the user has already made a selection of dishes. This selection of dishes is provided to the control unit 110 over the communication network 115.

The control unit 110 may then retrieve a respective recipe 160, 170, associated with the selected dishes from the database 120. A time interval structure of recipe steps, such as e.g. a working list to be used by the user is then prepared by the control unit 110, specifying in which order to perform the different steps of the respective recipes 160, 170, and/or the respective completion time of each recipe step. The composition of the time interval structure/work list may be made by the control unit 110 in order to minimise the cooking time, to avoid that food deteriorate by having to wait too long, and also for the dishes to be ready for the meal to be served at approximately the same time.

The control unit 110 may compose the work list based on required work intensity of the user. Some recipe steps may for example not require any attention at all until the step is about to be ready, but still take some time, such as e.g. defrosting a frozen fish or boiling potatoes. The user may then start performing another recipe step of the other recipe 160, 170 in parallel, while the fish is defrosting/the potatoes are boiling. Further, some recipe steps may require some surveillance by the user, such as frying sausages in a pan. However, this may not stop the user from being able to simultaneously perform another recipe step, e.g. of another recipe 160, 170. There may also be recipe steps which require the full attention of the user, such as for example the mixing of mayonnaise, where inattention of the user is likely to result in wasted ingredients. It is then inappropriate to incite the user to do another recipe step at the same time.

Further, the control unit 110 may compose the work list by determining which resources are required during each recipe step of the respective recipe 160, 170, and prevent any possible clash in required resources by different recipe steps.

Thereby, upon receiving the work list from the control unit 110, the user may start preparing the meal step by step by just following the provided work list.

Figure 1C:
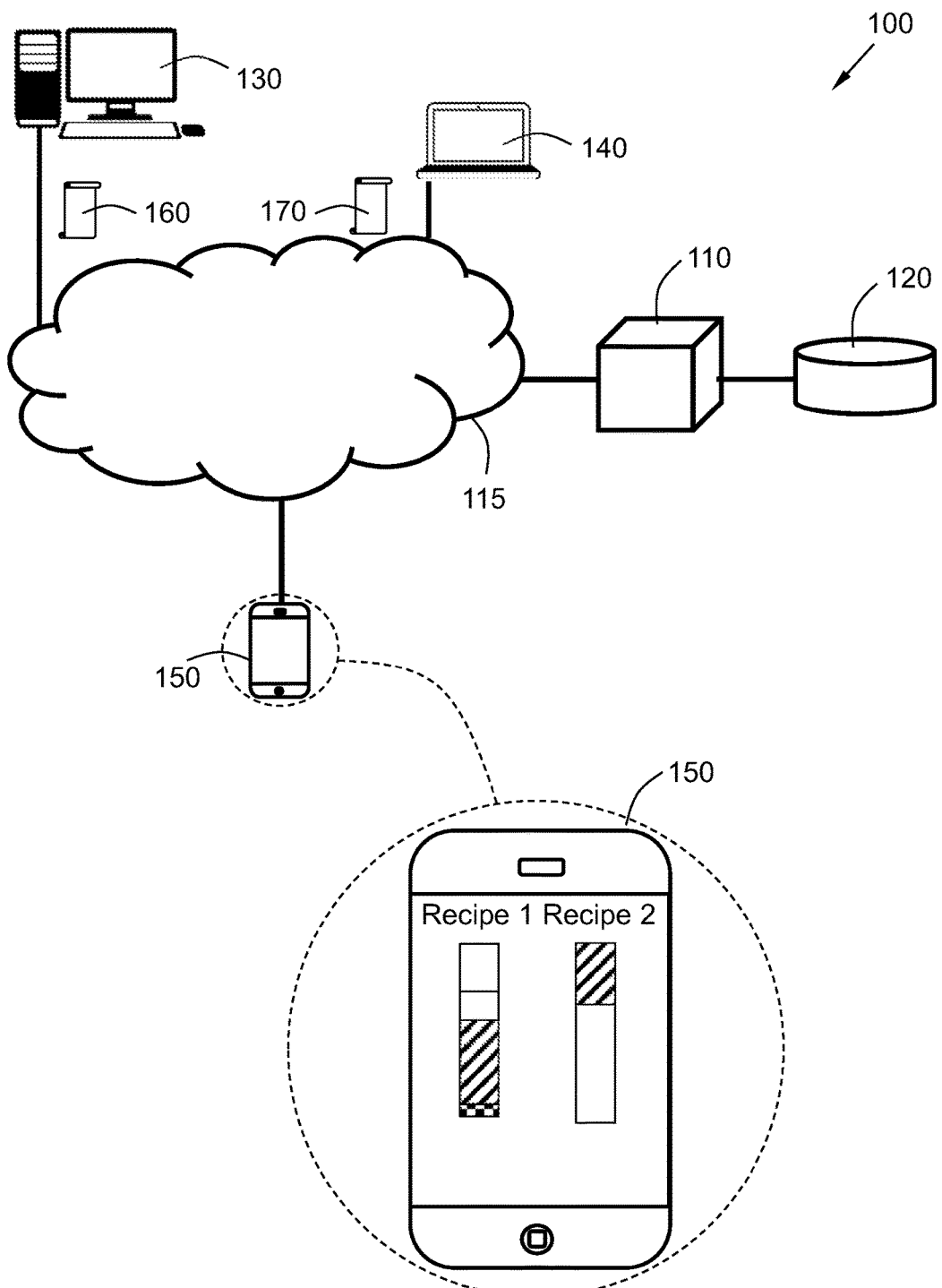
FIG. 1C is a block diagram illustrating a system according to an embodiment of the invention.

FIG. 1C is a schematic illustration over the system 100 illustrated in FIG. 1A, but at a later moment in time, alternative to the illustration in FIG. 1B. The user has made a selection of dishes for a meal. This selection of dishes is provided to the control unit 110 over the communication network 115.

The control unit 110 may retrieve a respective recipe 160, 170, associated with the selected dishes from the database 120. A time interval structure wherein the user's work of the selected recipes 160, 170 is then planned and provided to the user's communication device 150, based on the required work intensity of each recipe step of the respective recipe 160, 170, and the maximum time limit of each recipe step. In the illustrated arbitrary non-limiting example, the recipe steps are classified as having 0% intensity; 50% work intensity; or 100% work intensity. The time interval structure may be organised in order to avoid that the user exceeds 100% total work intensity at the same time by adjusting time intervals for the recipe steps, while at the same time avoiding that the maximum time limit for any step is exceeded for avoiding that any food deteriorate by having to wait too long.

Figure 2:
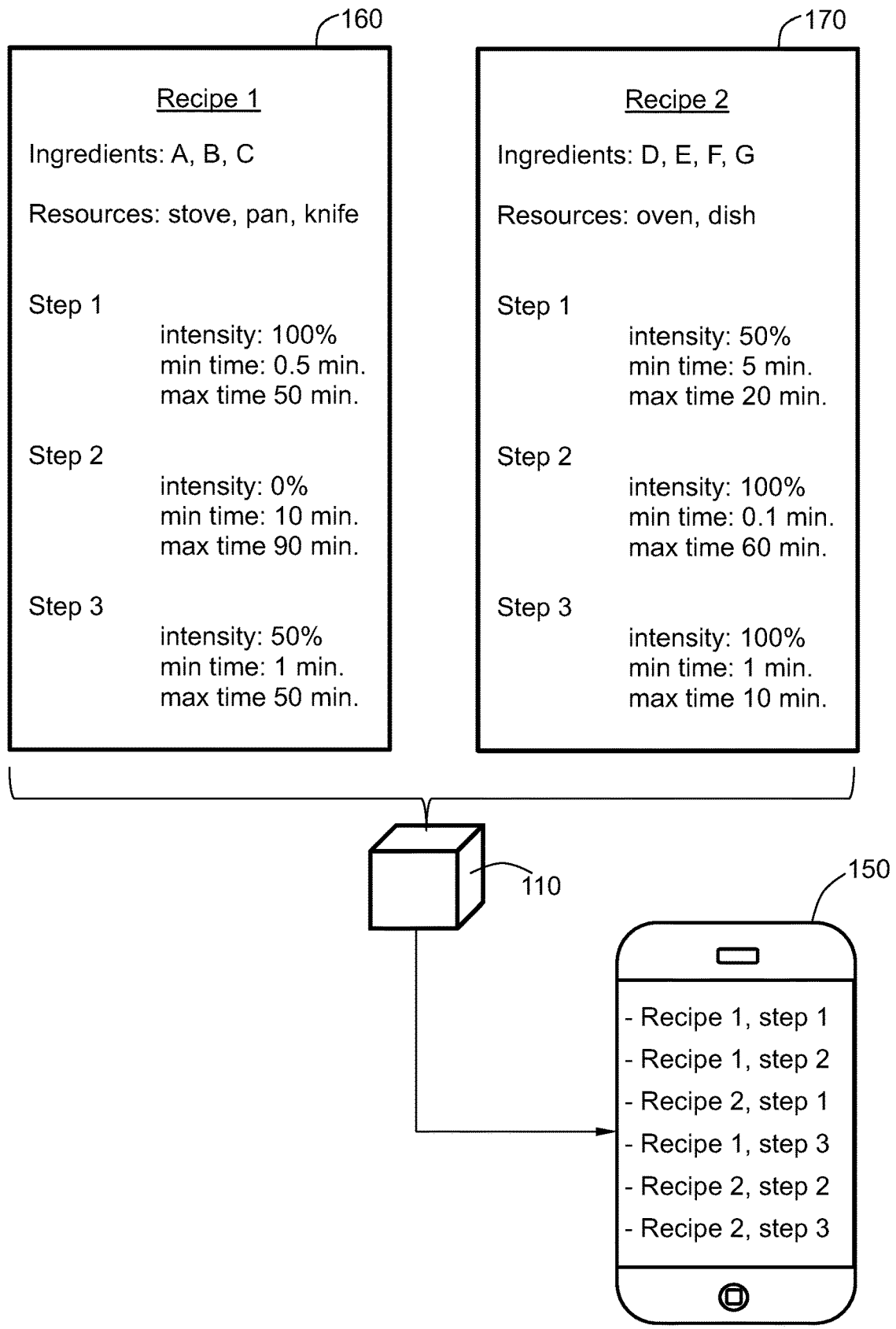
FIG. 2 is a block diagram illustrating merging of two recipes into a time interval structure of recipe steps.

FIG. 2 is a block diagram illustrating merging of two recipes 160, 170 into a time interval structure of recipe steps/aggregated work list by the control unit 110, provided to the communication device 150 of the user. This is merely an arbitrary example; another number of recipes 160, 170 such as e.g. three, four, five, etc. may be combined for a meal in other embodiments.

The user may select dishes according to the procedure discussed and presented in FIG. 1A.

A common recipe format is used for all recipes 160, 170 uploaded to and stored in the database 120. Different, independent recipe authors 130, 140, may be inclined to write their respective recipes 160, 170 in a different and personal style. It thereby becomes difficult or even impossible to combine recipes 160, 170 of different recipe authors 130, 140 into a common work list for preparing a meal. By using the common recipe format and only accept recipes 160, 170 written on the common recipe format, thereby forcing the recipe authors 130, 140 to use the common recipe format, it becomes possible to combine different recipes 160, 170 into a common work list for preparing a meal.

Thereby, a platform is provided where independent recipe authors 130, 140 may upload and store recipes on dishes, which then may be displayed and presented to users, thanks to the common recipe format.

The common recipe format may specify ingredients of the dish. Further the common recipe format may specify a sequence of recipe steps to be performed in order to prepare the dish. Required resources for each recipe step may be specified. It may thereby be avoided that two recipe steps requiring the same resources are scheduled in the common work list at the same time, in some embodiments.

Further the common recipe format may specify a required user intensity of each recipe step. This may be entered by the recipe author 130, 140 e.g. as percentages of the user's total amount of attention, in categories, such as "none", "only monitoring", and "full attention", as a colour code, as a chart, a diagram staple etc., in some non-limiting examples. It is thereby possible for the control unit 110 to determine how to compose the time interval structure of recipe steps/aggregated work list of the user in an optimal way, so that recipe steps could overlap when none, or only a limited amount of attention is required for at least one of the recipe steps, also when belonging to different recipes 160, 170.

The common recipe format also specifies a maximum time limit for each recipe step of the recipes 160, 170. The maximum time limit may be the longest time period which the recipe step could be stalled without deterioration of the ingredients. The maximum time limit of the last recipe step of the recipe 160, 170 thus indicates how long time the prepared dish could rest before deterioration. The maximum time limit of a stew or pasta sauce may be several hours, or even days while the maximum time limit of pasta may be e.g. half an hour, just to mention some examples. By specifying the maximum time limit of each recipe step, the control unit 110 is enabled to plan and orchestrate the time interval structure, e.g. the order of the work list and time interval length of recipe steps, in order to avoid that any food becomes deteriorated due to having been putted on hold for too long time.

In some embodiments, the control unit 110 may measure and keep track of the working time of the user of each recipe step. In some embodiments, a warning may be generated and emitted by the control unit 110 to the user's communication device 150 when the maximum time limit of the particular recipe step is approached, reached or exceeded. Thereby, the user may be alerted when the maximum time limit of a particular recipe step is about to be exceeded and may take appropriate measures to avoid that food is deteriorated.

In some embodiments, an alert may be generated when the user has worked with a recipe step for e.g. 70% (in a non-limiting arbitrary example) of the maximum time, in order to give the user time to finish the critical recipe step. Such alert may be sent as output to the user's communication device 150 e.g., in form of a text message, a visual message, an audio message and/or a tactile message in different embodiments.

The common recipe format may also specify a minimum time limit for each recipe step of the recipes 160, 170, in some embodiments. The minimum time limit may be the briefest possible time period on which the recipe step may be performed. The minimum time limit may for example be less than 1 minute in some embodiments. In other embodiments, for example when boiling pasta, the minimum time limit may be 10 minutes; i.e. it is required to cook pasta for ten minutes in order to be edible, in case the pasta is put into boiling water. The average cooking time will however be longer as it will take some time to boil the water. The minimum time limit of each respective recipe step may be used by the control unit 110 to plan the time interval structure, such as order and time interval length of the recipe steps on the aggregated work list.

It may be noted that the specified minimum time limit and maximum time limit, respectively, are not related to the actual performance time of the user for each recipe step. Instead the minimum/maximum time limit is/are related to the edible and possible deterioration thereof. It is thereby possible for the control unit 110 to compose the aggregated worklist of the user, focusing on the quality/taste of the edible and the future dish rather than on the capacity of the user, which will result in a more palatable meal.

By forcing the recipe author 130, 140 to specify the work intensity and the maximum time limit of each recipe step, and in some embodiments also the minimum time limit of each recipe step and/or the required resources during each recipe step, by the common recipe format, the control unit 110 is enabled to plan the order of the aggregated recipe steps and the completion time of each recipe step on the aggregated worklist in order to optimise the total preparation time of the meal. Optimise in the current sense means avoiding that any food deteriorates and enable serving of all dishes that are supposed to be eaten together in the meal at the same time.

The work intensity of each recipe step may be indicated to the user, e.g. by a graphic indication or a colour code; where e.g. green may indicate no attention required at all; yellow may indicate some monitoring of the preparation and red may indicate full attention from the user. The work intensity may alternatively be expressed as percentages of the user's total amount of attention, in categories, such as "none", "only monitoring", and "full attention", as a chart, a diagram staple etc., as previously mentioned, e.g. in FIG. 1C. It thereby becomes easier for the user to understand the structure of the generated work list and plan the work. An advantage with graphical and/or visual illustration of the work intensity, instead of text based presentation, is that the work intensity is immediately understood by the user, also when he/she is illiterate, dyslectic, stressed or visually impaired.

Also, in some embodiments, the maximum time limit and/or the minimum time limit of each recipe step may be indicated to the user, not in order to estimate the cooking time, but rather to warn the user that edibles may deteriorate when the maximum time limit for each step is exceeded. Alternatively, the edible may not be ready for consumption when the minimum time limit is not exceeded.

Furthermore, by indicating the required resources, the user knows what utensils are required so that he/she can avoid dishes requiring utensils he/she does not has access to. The user may also thereby be alerted for re-use of some resources. For example, in case the frying pan is used in two different recipe steps of two different recipes 160, 170, the user becomes aware that he/she has to clean the frying pan between the steps or needs to use two frying pans.

In some embodiments, the time interval structure, or aggregated work list may be continuously monitored and updated by the control unit 110, e.g. in case the user is/becomes delayed in a recipe step for various reasons. Thus the user in some embodiments may report the termination of each recipe step, and/or the beginning of each recipe step. In other embodiments, the user may inform the control unit 110 concerning an occurred delay, e.g. due to a telephone call or another similar unexpected event. The control unit 110 may then rearrange the time interval structure in order to optimise the food cooking, i.e. avoid that any food deteriorates.

Figure 3:
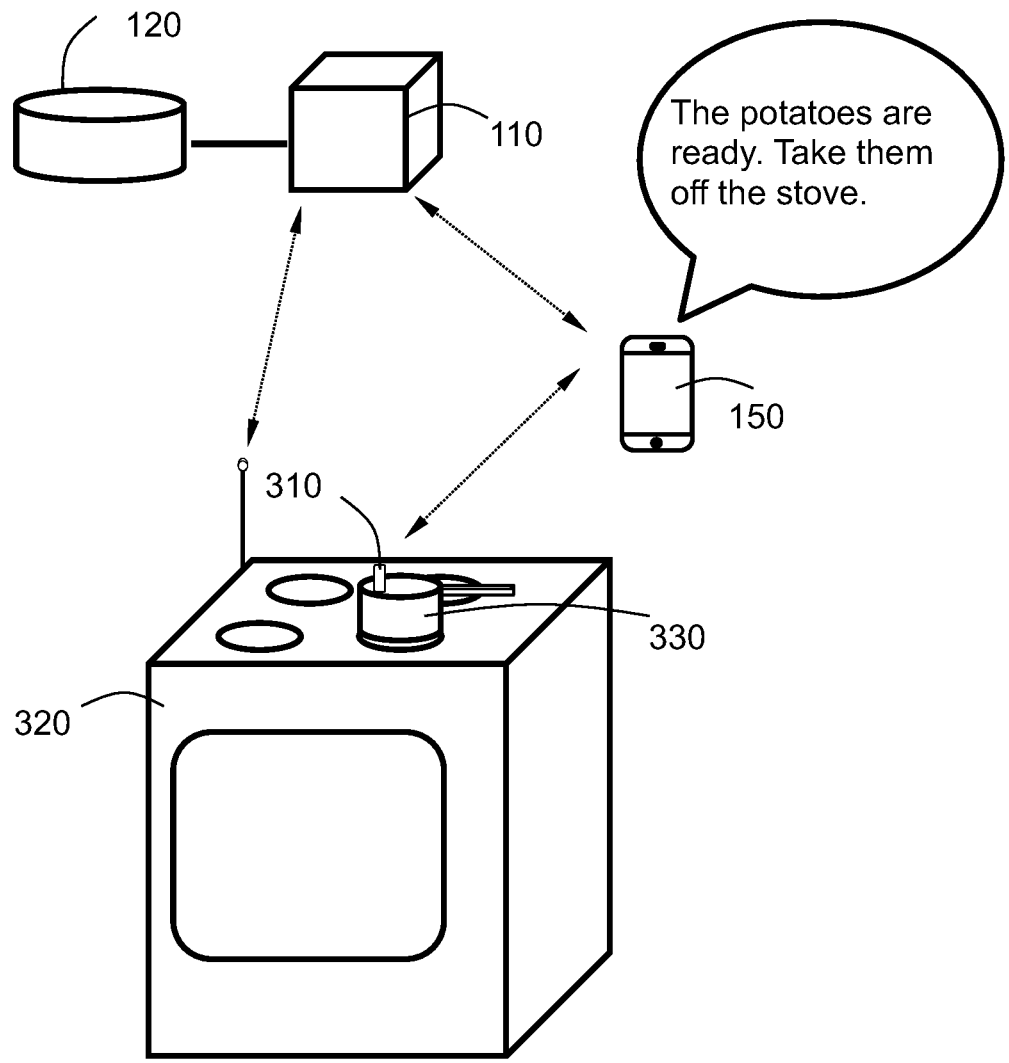
FIG. 3 illustrates an embodiment wherein a sensor is measuring a parameter and interacts with the time interval structure of the user.

FIG. 3 illustrates an alternative embodiment wherein a sensor 310 is measuring a parameter and interacts with the time interval structure of recipe steps/aggregated work list of the user, via the control unit 110 and/or the user's communication unit 150.

In the illustrated example, the sensor 310 is measuring temperature of a content of a cookware 330, such as a pot, situated on a kitchen appliance 320, such as e.g. a stove. The sensor 310 may alternatively measure the inner temperature of an edible, such as a potato, in the cookware 330. In an illustrative but non-limiting example, the user may be boiling potatoes as a recipe step. The sensor 310 may measure either the temperature of the water in the pot 330, or the inner temperature of one of the potatoes, in some embodiments. These measurements may be performed by the sensor 310 continuously, or at predetermined or configurable time intervals. The made measurement values may then be provided via wired or wireless signals to the control unit 110, either directly via a cellular network, WiFi or the like, or indirectly via short range wireless communication such as Bluetooth, Ultra Mobile Broadband, Near Field Communication, Radio-Frequency Identification (RFID), Z-wave, ZigBee, IPv6 over Low power Wireless Personal Area Networks (6LoWPAN), Wireless Highway Addressable Remote Transducer (HART) Protocol, Wireless Universal Serial Bus (USB), or similar communication protocol to the communication device 150 of the user, which in turn may forward the made measurement value to the control unit 110.

In some embodiments, the temperature of the water in the pot 330 may be measured by the stove 320, i.e. the sensor 310 may be integrated in the stove 320, or other kitchen appliances.

The control unit 110, may then, upon receiving the sensor measurement values, determine when the cooking step is ready, either by comparing the inner temperature of the edible with a temperature interval associated with the edible, or by computing, based on the measurement values of the sensor 310 and knowledge about cooking time for the particular edible, when the edible may be expected to be ready. The cooking time of e.g. potatoes may be dependent on e.g. if they are put into cold water or boiling water. The cooking time may also be dependent on size of the potatoes, which possibly may be determined by another sensor value, such as e.g. an image taken by the user's communication device 150 in case a camera is comprised therein, or by another sensor 310 of the user, comprising a camera. Or a temperature gauge inserted in the middle of a representative potato in the boiling water. Performance capacity of the stove 320 will also influence the time required for heating a hotplate of the stove 320. Such information may be obtained by the control unit 110 directly from the stove 320 of the user, in some embodiments.

When the control unit 110 has estimated that the edible is ready, based e.g. on an input value from the sensor 310 (such as inner temperature of an edible), or a time measurement since cooking begun, an urging may be sent to the user, encouraging him/her to discontinue the cooking/check if the edible is ready, in some embodiments. Such encouragement may comprise e.g. a text message, a visual message, an audio message and/or a tactile message outputted on the user's communication device 150. In other embodiments, the control unit 110 may generate and send a command to the stove 320 to discontinue the cooking when the edible is estimated to be ready, based on the sensor value/-s.

The sensor 310 may in some embodiments be integrated in the cookware 330, kitchen appliance 320 and/or oven or other similar kitchen resource.

In some embodiments, the sensor 310 may comprise a humidity sensor situated on the surface of the oven for example in some embodiments, alerting the user via an alerting signal generated by the control unit 110 when a humidity exceeding a threshold value is exceeded. In some embodiments, the control unit 110 may generate control signals for decreasing the heat of the stove 320.

The above discussed example is merely an example of sensor 310 and how it may be used. The sensor 310 may in some embodiments comprise a thermometer, configured to measure temperature in some embodiments. Such thermometer may comprise e.g. a thermistor, a resistive thermometer, an infrared thermometer, a resistance temperature detector, a heat flux sensor, a pyrometer, a bimetal thermometer, a silicon bandgap temperature sensor, etc., in combination with a wireless transmitter for transmitting the measurement value/-s.

Such temperature sensor 310 may be applied, besides the example above, for determining temperature of a frozen edible which is to be defrosted (which may be a recipe step); the temperature of an edible which is prepared in an oven, microwave oven, convection oven, a barbecue, etc.

However, the sensor 310 may alternatively, or in addition comprise a camera, a stereo camera, an infrared camera, a video camera or similar device, in different embodiments. Thus, photos taken by the sensor 310 may be provided to the control unit 110. The control unit 110 may upon reception of the images in conjunction with an image recognition program be configured for image recognition/computer vision and object recognition.

Computer vision is a technical field comprising methods for acquiring, processing, analysing, and understanding images and, in general, high-dimensional data from the real world in order to produce numerical or symbolic information. A theme in the development of this field has been to duplicate the abilities of human vision by electronically perceiving and understanding an image. Understanding in this context means the transformation of visual images (the input of retina) into descriptions of world that can interface with other thought processes and elicit appropriate action. This image understanding can be seen as the disentangling of symbolic information from image data using models constructed with the aid of geometry, physics, statistics, and learning theory. Computer vision may also be described as the enterprise of automating and integrating a wide range of processes and representations for vision perception.

The image data of the sensor 310 may take many forms, such as e.g. images, video sequences, views from multiple sensors 310, etc. As already mentioned, the sensor 310 in form of a camera may be comprised in the user's communication device 150 in some embodiments.

Computer vision may comprise e.g. scene reconstruction, event detection, video tracking, object recognition, object pose estimation, learning, indexing, motion estimation, and image restoration, just to mention some examples.

According to some embodiments, the control unit 110 may determine that a dish is ready, based on an image captured of the dish, e.g. by analysing the colour of the edible and comparing it with a reference colour scheme, in some embodiments.

However, in other embodiments, the control unit 110 may determine that an ingredient, such as e.g. a vegetable, is improper or defect, based on an image of the ingredient, captured by the sensor 310, by applying the image recognition program and comparing the received image/-s with a set of reference images.

In case a defect ingredient is detected by the control unit 110, the control unit 110 may generate and transmit an alert to the user. Such alert may be outputted to the user's communication device 150 e.g., in form of a text message, a visual message, an audio message and/or a tactile message in different embodiments.

In some embodiments, the control unit 110 may as an output control the action of a cooking device of the user, such as the oven, the stove, the micro-oven, the slow-cooker, the rice cooker, etc., based on information received from the user concerning when the meal is to be ready. In some embodiments, the control may be further based on sensor values detected by the sensor 310, such as e.g. temperature of the food.

In some embodiments, the sensor 310 may comprise an olfactory sensor, e.g. for determining if an edible is fresh or deteriorated. Based on this information, the control unit 110 may determine if the checked edible is appropriate for human consumption and, if not, trigger the user's communication device 150 to emit a warning to the user, for not using the edible.

In some embodiments, the sensor 310 may detect bacterial growth on an edible. When this information is received by the control unit 110, the control unit 110 may compare the detected bacterial growth with a bacterial growth threshold limit. In case the threshold limit is exceeded, the control unit 110 may trigger an alert by the user's communication device 150 that may warn the user from utilising the edible in question.

Figure 4:
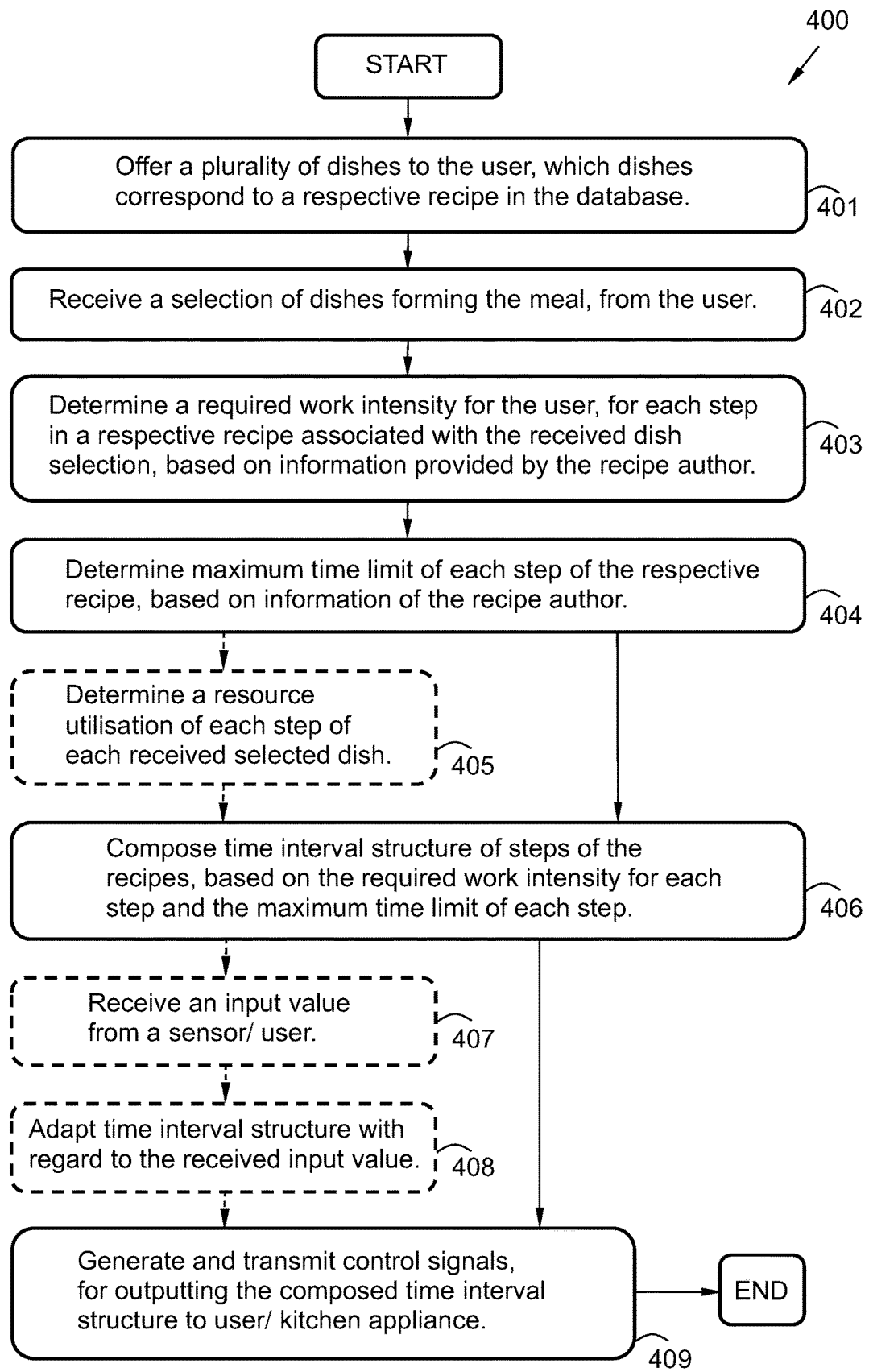
FIG. 4 is a flow chart illustrating a method according to an embodiment.

FIG. 4 is a flow chart illustrating embodiments of a method 400 in a control unit 110 for assisting a user in orchestrating preparation of a meal comprising a plurality of dishes, based on recipes 160, 170 stored in a database 120 on a common predetermined recipe format. The recipes 160, 170 may have been provided by independent, i.e. distinct recipe authors 130, 140, thanks to the predetermined common recipe format.

To appropriately assist the user in meal preparation, the method 400 may comprise a number of actions 401-409. It is however to be noted that any, some or all of the described actions 401-409, may be performed in a somewhat different chronological order than the enumeration indicates. At least some of the actions 401-409 may be performed simultaneously or even be performed in an at least partly reversed order according to different embodiments. Further, it is to be noted that some actions may be performed only in some alternative embodiments, such as e.g. actions 405, and 407-408.

Action 401 comprises offering a plurality of dishes to the user via a communication device 150, which dishes correspond to a respective recipe 160, 170 in the database 120.

The dishes may be outputted to the user e.g. in form of images/video sequences of the readymade dishes and/or a descriptive text of the dish. An audio voice presentation of the dishes is another option; or a combination of images, video, text and/or audio presentation.

Action 402 comprises receiving a selection of dishes forming the meal, selected by the user.

The user selection of dishes forming the meal the user will prepare may in some embodiments be received over a touch-free communication interface of the user's communication device 150. Such touch-free communication interface may comprise movement detection and recognition based on camera images captured by the user's communication device 150 of the user. In other embodiments, the touch-free communication interface may be based on voice recognition of audio signals captured by a microphone in the user's communication device 150.

Action 403 comprises determining a required work intensity for/from the user, for each step in a respective recipe 160, 170 associated with the received 402 dish selection, based on information provided by the recipe author 130, 140.

The recipe author 130, 140 may be forced to specify required work intensity for/from the user for each recipe step, in some embodiments, according to the predetermined common recipe format, when uploading/storing the recipe 160, 170 in the database 120.

Information concerning required work intensity for/from the user, as determined by the recipe author 130, 140, may thus be stored in the database 120, associated with each recipe step.

Action 404 comprises determining a maximum time limit of each step of the respective recipe 160, 170, based on information provided by the recipe author 130, 140, according to the common recipe format.

The recipe author 130, 140 may be forced to specify the maximum time limit of each recipe step by the predetermined common recipe format, when uploading the recipe 160, 170 to the database 120. Thereby, thanks to the common recipe format, and by enforcing the recipe authors 130, 140 to adapt their recipes 160, 170 to the common recipe format, it becomes possible to combine recipe steps of different recipes of different recipe authors 130, 140 into the meal.

In some embodiments, also a minimum time limit of each recipe step of the respective recipe 160, 170, may be determined, based on information provided by the recipe author 130, 140. Thereby, in at least some of these embodiments, a time window may be defined for each recipe step, defined by the minimum time limit and the maximum time limit of each recipe step, which time window defines a time period wherein the food prepared during the recipe step is optimal from a taste point of view.

Action 405, which may be performed only in some embodiments, comprises determining a resource utilisation of each recipe step of each received 402 selected dish.

The recipe author 130, 140 may be forced to specify the resource utilisation of each recipe step by the predetermined common recipe format, when uploading the recipe 160, 170 to the database 120.

Action 406 comprises composing a time interval structure of the various steps of the respective recipes 160, 170, such as e.g. a working order of the recipe steps of the respective recipes 160, 170, based on the determined 403 required work intensity for/from the user for each recipe step and the determined 404 maximum time limit of each recipe step.

The time interval structure, such as e.g. an aggregated working order, may also in some embodiments specify a time interval comprising a maximum time limit and possibly also a minimum time limit within which each respective recipe step is to be performed.

The time interval structure/working order may be composed in order to optimise the meal preparation. By avoiding that food is deteriorated according to the method 400, it is ensured that the meal will be as tasty as possible.

The time interval structure/working order may be composed in order to avoid a conflict in resource utilisation between steps of the recipes 160, 170, in some embodiments.

Further, the time interval structure/working order may be composed in order to make the total preparation time of the meal as short as possible in some embodiments. In addition, the time interval structure/working order may be composed in order to get all the dishes ready at the same time, within a time interval, in some embodiments.

Action 407, which may be performed only in some embodiments, may comprise receiving at least one input value from a sensor 310, or the communication device 150 of the user.

The input value may be e.g. a sensor signal received from a sensor 310. The sensor 310 may be situated in the kitchen or other similar location of the user. The sensor 310 may be e.g. a temperature sensor, an image sensor, etc., in different embodiments. The sensor 310 may be integrated into a cookware 330, kitchen appliance 320 or other kitchen resource of the user; or in the user's communication device 150, etc.

However, in some embodiments, the input value may be inputted by the user, e.g., upon encouragement of the control unit 110, for example when a recipe step is terminated or started. The control unit 110 may then activate a time measuring functionality and keep track of the time spent by the user on each recipe step. Thereby, the control unit 110 may predict when the user is approaching the maximum time limit, such as e.g. when it is five minutes' left in a non-limiting example. The user may thereby be encouraged by the control unit 110 to speed up in order to avoid food deterioration, in some embodiments.

The input value may comprise e.g. a request to stall the food preparation process, e.g. due to a telephone call or other not foreseen event that suddenly occurs while cooking, in some embodiments, which in turn may trigger an adaptation of the time interval structure according to step 408.

The user may then stop the process, e.g. by a signal transmitted on the user's communication device 150.

Action 408, which may be performed only in some embodiments, may comprise adapting the time interval structure of the recipe steps with regard to the received 407 input value.

The adaptation of the time interval structure of the recipe steps may comprise changing an intended time interval of a recipe step, and/or order of recipe steps, etc., however, without exceeding the maximum time limit.

The adaptation of the time interval structure of the recipe steps may further comprise changing (decreasing) heating temperature of a dish situated in a kitchen appliance 320 and/or a cookware 330, in order to prolong the cooking time, e.g. when information has been received 407 that the user has been stalled by an incoming phone call or other unplanned event.

Thus, the time interval structure may be dynamically adjusted to the reality, the capacity of the user and possible occurring interruptions. By not locking the time interval structure to the initially planned time interval structure, the user is helped to handle the cooking, also in a chaotic situation where the user is interrupted by various occurrences.

Action 409 comprises generating and transmitting control signals to the communication device 150 of the user, for outputting the composed 406 time interval structure of the recipe steps, such as e.g. an aggregated working order.

The generated and transmitted 409 control signals to the communication device 150 of the user, or to a kitchen appliance 320 of the user, may comprise information concerning the adapted 408 time interval structure.

The composed 406 time interval structure/working order may then be outputted by the communication device 150 of the user by presenting e.g. a text message, an image message, an audio message comprising voice reading, a projection, an augmented reality image, or a combination thereof in some embodiments.

Further, the presentation may be outputted on the user's communication device 150, or possibly in another presentational device situated in the user's kitchen, or a combination thereof.

In some embodiments, a monitoring of the preparation time of each respective recipe step may be performed continuously by the control unit 110, and a comparison with the maximum time limit of each recipe step may be made. When the maximum time limit is exceeded, or when the maximum time limit is approached, an alert may be generated and sent to the user, encouraging him/her to speed up and terminate the recipe step. Thereby waste or deterioration of food may be avoided.

In embodiments wherein the control unit 110 has received 407 an input value from the user, such as e.g. a sensor signal from a sensor 310 associated with the user, the generation and transmission of control signals to the communication device 150 of the user may concern a step of the composed 406 time interval structure of the steps, when the received 407 input value exceeds a threshold limit, associated with the step.

Some examples may be e.g. a warning signal or voice message when a pan 330 on a stove 320 is about to become too hot. In some embodiments, control signals may instead be sent to the kitchen appliance/stove 320 to adjust the temperature. Some other examples may comprise sending control signals to the communication device 150 of the user to output a warning signal or voice message when it is time to take out a gratin from the oven; or an encouragement to the user to speed up, as an edible in a certain step of the process is about to deteriorate.

The sensor 310 may be e.g. a temperature sensor, an image sensor, etc. in different embodiments. The sensor 310 may be integrated into a cookware 330, kitchen appliance 320 or other kitchen resource of the user, in the user's communication device 150, etc.

In some embodiments, e.g. during a particular severe part of a recipe 160, 170, the generated and transmitted control signals may comprise instructions for the user's communication device 150 to output more detailed instructions, thereby guiding the user through at least a subset of the composed time interval structure of the steps. The outputted information may be e.g. a voice message, a film sequence, an image, a cartoon, a sequence of text messages and images, and/or an augmented reality image stream, etc.

Furthermore, in some embodiments, the outputted information of the communication device 150 of the user may be an alert or an encouragement to the user to discontinue the recipe step and/or check if the step/edible/dish is ready. The information may be outputted via the user's communication device 150, e.g. on the display as a visual message such as a text message, as an audio message such as voice reading or a signal, as a tactile signal, etc., or a combination thereof.

The control unit 110 may in some embodiments generate and transmit command signals for discontinuing a recipe step, e.g. by adjusting temperature of the kitchen appliance 320, such as a stove, oven, microwave oven, rice cooker, hot pot, etc., without further interaction of the user.

In some alternative embodiments of the method 400, the control unit 110 may keep track of each recipe step of the user, e.g. by requesting the user to continuously confirm when starting each recipe step. This may be made continuously through any or all of the recipes 160, 170, or only through a subset of the recipes 160, 170, such as e.g. a subset which is in particular severe.

Further, the control unit 110 may compare the time spent on the currently performed recipe step with the maximum time limit associated with the recipe step. When the measured time the user has spent on the recipe step is approaching the maximum time limit, such as e.g. 70%, 80%, 90%, etc., of the maximum time limit. Thereby, the user is alerted when the maximum time limit of a recipe step or resting time of a ready dish is approaching and he/she may speed up the procedure for avoiding that food becomes deteriorated.

Figure 5:
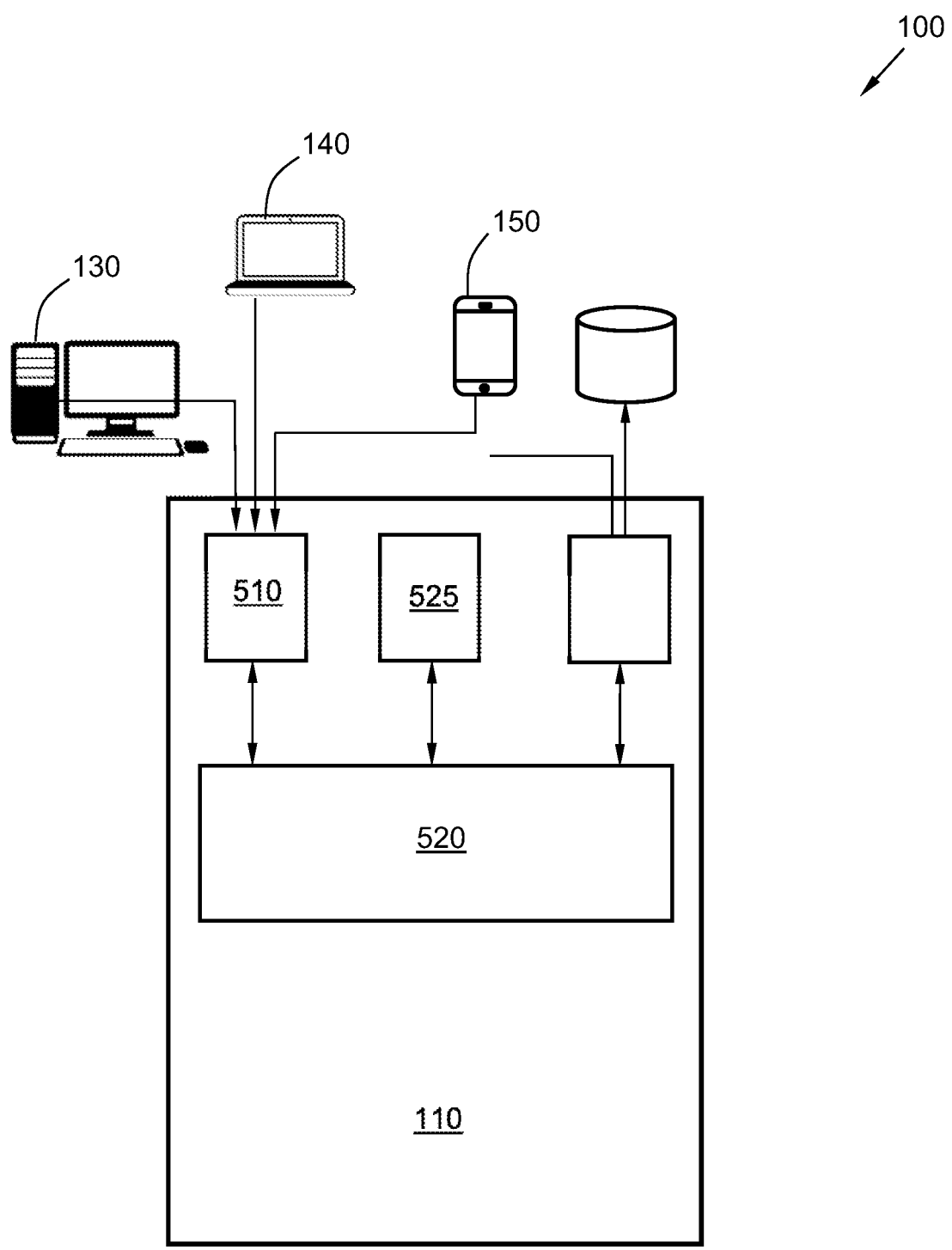
FIG. 5 is a control unit according to an embodiment.

FIG. 5 depicts an embodiment of a system 100 for assisting a user in orchestrating preparation of a meal comprising a plurality of dishes. The system 100 comprises a control unit 110, configured to perform at least some of the described actions 401-409 of the method 400 for assisting a user in orchestrating preparation of a meal comprising a plurality of dishes, based on recipes 160, 170 stored in a database 120 on a common recipe format, by independent recipe authors 130, 140.

The control unit 110 is configured to offer a plurality of dishes to the user via a communication device 150, which dishes correspond to a respective recipe 160, 170 in the database 120. Further the control unit 110 is configured to receive a selection of dishes forming the meal, selected by the user, via a communication interface. In addition, the control unit 110 is also configured to determine a required work intensity of the user, for each step in a respective recipe 160, 170 associated with the received dish selection, based on information provided by the recipe author 130, 140 according to the common recipe format. The control unit 110 is furthermore configured to determine a maximum time limit and, in some alternative embodiments, also a minimum time limit of each step of the respective recipe 160, 170, based on information provided by the recipe author 130,

140. The control unit 110 is also configured to compose a time interval structure/working order of the recipe steps of the respective recipes 160, 170, based on the determined required work intensity of the user for each step and the determined maximum time limit and, in some embodiments, minimum time limit of each recipe step. The control unit 110 is configured to generate and transmit control signals to the communication device 150 of the user, to output the composed time interval structure/working order to the communication device 150 of the user.

In some embodiments, the control unit 110 may further be configured to determine a resource utilisation of each recipe step of each received selected dish, based on information provided by the recipe author 130, 140. The resource may be a cookware 330, a kitchen appliance 320, a domestic appliance, a kitchen utensil, etc. Further the control unit 110 may be configured to compose the time interval structure/working order, in order to avoid a conflict in resource utilisation between steps of the respective recipes 160, 170, based on the determined resource utilisation of each respective recipe step, in some embodiments.

The control unit 110 may be configured to generate control signals to output the composed time interval structure/working order to the user by voice reading in some embodiments.

Further, the control unit 110 may be optionally configured to receive at least one input value associated with the user. The input value may be e.g. a sensor value from a sensor 310 of the user, or the communication device 150 of the user. The control unit 110 may also be configured to generate control signals to output information to the user concerning a recipe step of the composed time interval structure/working order when the received input value, such as e.g. sensor value, exceeds a threshold limit, associated with the recipe step.

The control unit 110 may in addition also be configured to adapt the time interval structure of the steps with regard to the received input value. Further the control unit 110 may be configured to generate and transmit control signals to the communication device 150 of the user, or to a kitchen appliance 320 of the user, may comprise information concerning the adapted time interval structure, in some embodiments.

In some alternative embodiments, the control unit 110 may be configured to receive the user selection of dishes forming the meal is received over a touch-free communication interface of the user's communication device 150.

The system 100 also comprises a database 120 comprising recipes 160, 170, entered on a common recipe format by independent recipe authors 130, 140, specifying a required work intensity for/from the user, for each step in a respective recipe 160, 170, and a maximum time limit and, in some embodiments, also a minimum time limit of each step of the respective recipe 160, 170.

The database 120 may comprise a Database Management System (DBMS), i.e. a computer software application that interacts with the user, other applications, and the database 120 itself to capture and analyse data. A general-purpose DBMS is designed to allow the definition, creation, querying, update, and administration of databases. Some arbitrary examples of DBMSs may comprise e.g. MySQL, PostgreSQL, Microsoft SQL Server, Oracle, Sybase, SAP HANA, and/or IBM DB2.

Further, in some embodiments, the system 100 may also comprise a communication device 150, of the user. The communication device 150 may typically comprise a mobile cellular telephone, or similar device. The communication device 150 may be arranged, in some embodiments, for touch-free communication with the user.

Also, the system 100 may further comprise a sensor 310 situated in the user's kitchen or other corresponding location of the user, in some embodiments. The sensor 310 may comprise e.g. a temperature sensor, a camera, a video camera, an infrared camera etc. The sensor 310 may be integrated in a kitchen appliance 320, or a kitchenware 330 in some embodiments.

The above described control unit 110, as illustrated in FIG. 5 may according to some embodiments comprise a receiving circuit 510 configured for receiving uploaded recipes 160, 170 from recipe authors 130, 140. Further, the receiving circuit 510 is configured to receive signals from the user's communication device 150, e.g. a selection of dishes made by the user. The receiving circuit 510 may be configured to receive signals over a wired and/or wireless communication interface.

Further, the control unit 110 may according to some embodiments comprise a processor 520 for performing various computations, required for performing the method 400 according to at least some of the previously described steps 401-409. Such processor 520 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The here utilised expression "processor" may thus represent a processing circuitry comprising a plurality of processing circuits, such as, e.g., any, some or all of the ones enumerated above.

Furthermore, the control unit 110 may comprise a memory 525 in some embodiments. The optional memory 525 may comprise a physical device utilised to store data or programs, i.e., sequences of instructions, on a temporary or permanent basis. According to some embodiments, the memory 525 may comprise integrated circuits comprising silicon-based transistors. The memory 525 may comprise e.g. a memory card, a flash memory, a USB memory, a hard disc, or another similar volatile or nonvolatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 110 may comprise a transmitting circuit 530 in some embodiments. The transmitting circuit 530 may be configured for transmitting a signal to e.g. the database 120, the user's communication device 150 and possibly other devices associated with the user and/or the user's equipment. The transmitting circuit 530 may be configured to transmit signals over a wired and/or wireless communication interface.

The previously described actions 401-409 to be performed by the control unit 110 may be implemented through the one or more processors 520 within the control unit 110, together with a computer program for performing at least some of the functions of the actions 401-409. Thus, a computer program, comprising instructions for performing the actions 401-409 in the control unit 110 may perform the method 400 according to at least some of the actions 401-409, when the computer program is loaded into the one or more processors 520 of the control unit 110.

The computer program mentioned above may be provided for instance in the form of a tangible data carrier carrying computer program code for performing at least some of the actions 401-409 according to some embodiments when being loaded into the one or more processors of the control unit 110. The data carrier may be, e.g., a hard disk, a CD ROM disc, a memory stick, an optical storage device, a magnetic storage device or any other appropriate medium such as a disk or tape that may hold machine readable data in a non-transitory manner. The computer program may furthermore be provided as computer program code on a server and downloaded to the control unit 110 remotely, e.g., over an Internet or an intranet connection.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

Figure 6:
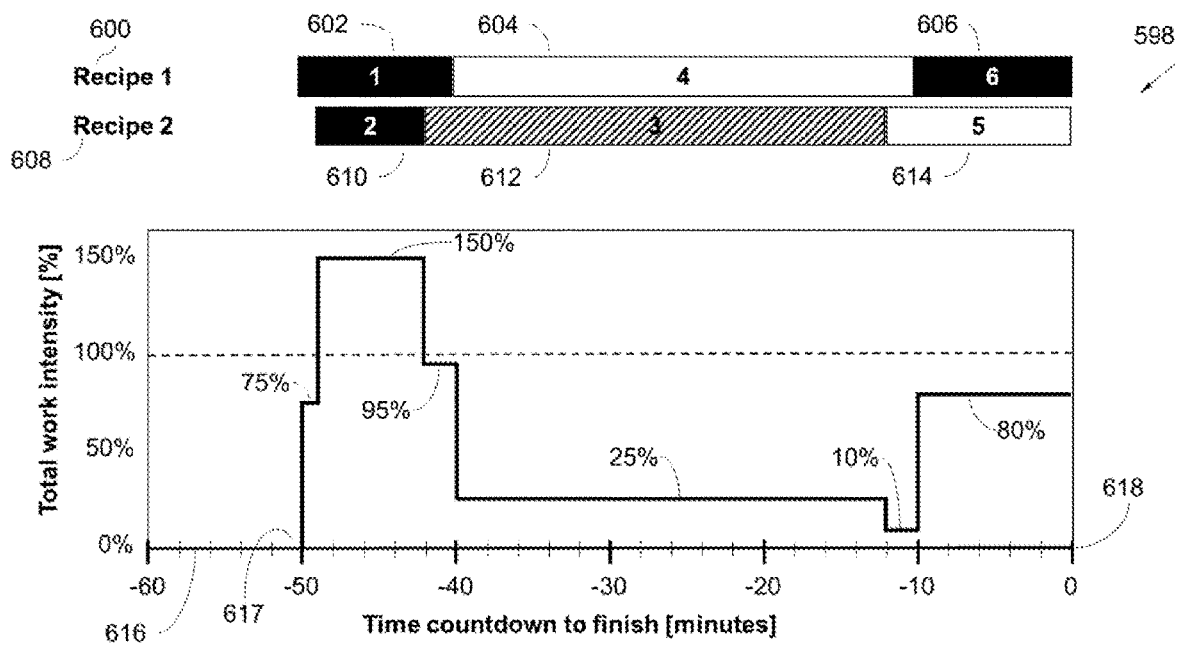
FIG. 6 is a schematic illustration of the present invention of two recipes that has a work order that exceeds the 100% maximum work intensity threshold.
Figure 7:
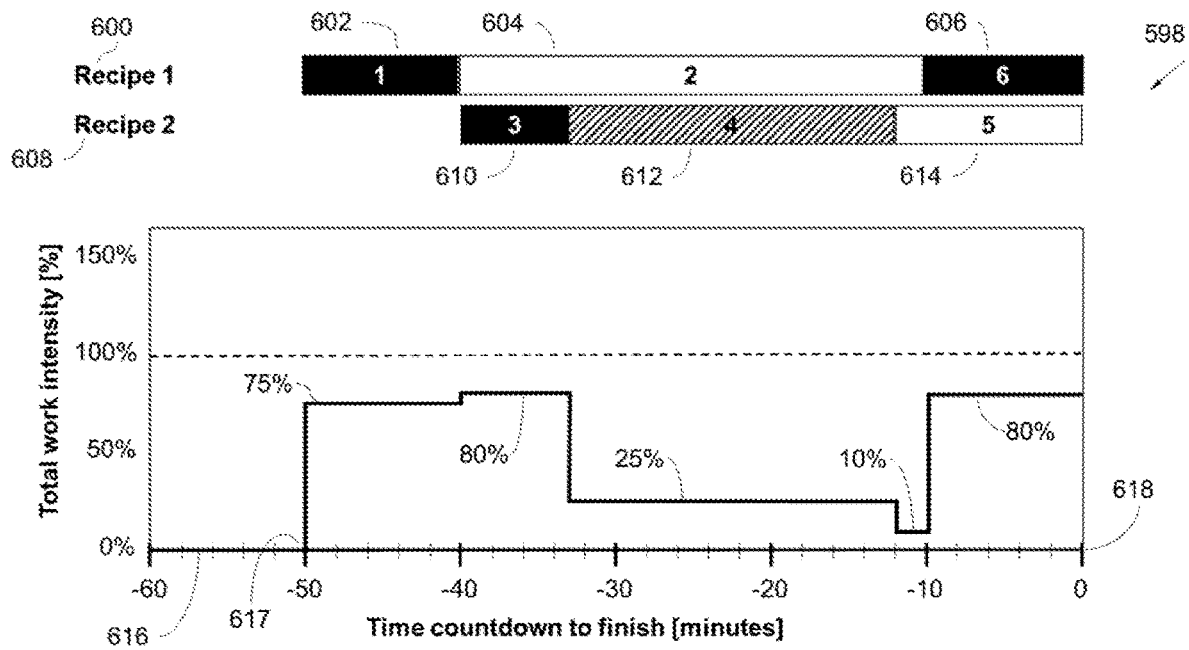
FIG. 7 is a schematic illustration of the present invention of the two recipes shown in FIG. 6 with a revised work order that never exceed the 100% maximum work intensity threshold.

With reference to FIGS. 6 and 7, one important feature of the present invention is that all the cooking recipes follow the same format that, among other things, includes a time interval to complete each task of the recipes, the required resources and required work intensity for each task of the recipes. Very often a meal requires multiple recipes that are prepared for eating at the same time. An initial step is to determine which of the recipes that takes the longest total time to complete. As described in detail below, each task has a time interval set by the recipe author that contains a minimum time, a base time and a maximum time. The time intervals are used by the recipe author to describe a window in time wherein it is realistic for the user to complete the task and also that the food will keep its good quality. Below the minimum time it is either unrealistic that the user is able to complete the cooking step or that the food stuff will not have time enough to give the desired cooking result. Above the maximum time, the recipe author believes there is a risk that the food may be deteriorated. The base time is set between the minimum and the maximum time and is used to determine the displayed time to complete the cooking step. The base time may vary anywhere from the minimum time to the maximum time. In some embodiments, the base time is allowed to vary within the complete interval range from minimum to maximum time. In other embodiments the base time limits may be adjusted to reflect the user's skill level e.g. so that the minimum time for completing a cooking step is set to some higher value than the minimum time because an inexperienced user might not be able to realistically reach the minimum time in the interval.

For example, the cooking of spaghetti requires a minimum of 6 minutes of boiling, the base time could be 8 minutes and the maximum time could be 10 minutes. Below the minimum time limit, 6 minutes, the spaghetti will be under cooked and not fit for eating and above the maximum time, 10 minutes in this case, the spaghetti will be overcooked and therefore not at its best for eating. The base time is preferably used to calculate the total time to complete the recipe and also to adjust the cooking order to reach a sustainable work effort for the user when planning from different recipes cooked together to form the complex meal. If the first recipe takes longer to complete, based on the total time base time of all the tasks in the recipe, then this first recipe gets a generally higher priority than the second recipe. Preferably, the first recipe and the second recipe should be completed at about the same time because they are both part of the same meal and should be served together.

Another important parameter set by the recipe author is the required work intensity to do each task. This is particularly relevant when two recipes must be prepared together at the same time and be completed at the same time to be eaten together as a meal. An important aspect of the present invention is that the method provides guidance to the person simultaneously preparing the two, or more, recipes in which order and how long each task should be performed. The user's/chef's work intensity may be divided into three or more groups such as 5% (low), 25% (medium) or 75% (high) work intensity. A low intensity cooking step or task is where the chef may be passive except for very short moments such as removing a pie from the oven or pouring water over vegetables etc. A medium intensity cooking step or task is where the chef is semi-active during the task and can also perform other tasks during this task. One example of such medium activities is stirring a soup now and then overviewing that a barbeque steak is not too burnt. A high intensity cooking step or task is where the chef is fully active and has difficulties in performing other active tasks during this task, such as chopping vegetables for a salad or whipping cream using a beater.

It is to be understood that the work intensity of a task may vary between 0% and 100%. It is further to be understood that the person preparing the meal can never perform more than 100% combined work intensity when performing simultaneous cooking steps or tasks. For example, it is not possible for the person to simultaneously do tasks that both require 75% work intensity because the total work intensity (in this case 150%) would exceed the maximum 100% which defines the user's full work capacity. However, it is thus possible to simultaneously do two tasks wherein, for example, one task requires 75% work intensity and the other 20% work intensity because the total work intensity is 95% which is less than 100%. The percentages are merely illustrative examples and any work intensity percentage from 0 to 100% may be used to define the user's/chef's expected engagement level.

As best shown in FIG. 6, a meal plan 598 may be formed by a cooking recipe 600 and cooking recipe 608 in parallel for eating at the same time. This means the recipes should be cooked or be simultaneously prepared so that both recipes are ready to be served at a joint eating time. Recipe 600 requires the completion of a first task 602, a second task 604 and a third task 606. Each task is defined by an instruction, a work intensity value and a time interval for completion within which a base time is set to define a realistic completion time for the respective tasks. For example, the first task 602 may have a minimum time of 10 minutes, a base time of 10 minutes and a maximum time of 20 minutes. The second task 604 may, for example, have a minimum time of 20 minutes, a base time of 30 minutes and a maximum time of 40 minutes. Similarly, the third task 606 may have a minimum time of 8 minutes, a base time of 10 minutes and a maximum time of 50 minutes. Similarly, recipe 608 requires the first task 610, the second task 612 and the third task 614. For example, the first task 610 may have a minimum time of 2 minutes, a base time of 7 minutes and a maximum time of 10 minutes. The second task 612 may, for example, have a minimum time of 3 minutes, a base time of 21 minutes and a maximum time of 60 minutes. The third task 614 may have a minimum time of 2 minutes, a base time of 12 minutes and a maximum time of 60 minutes. These examples illustrate that the number of tasks and task characteristics vary with each recipe. It is to be understood that a meal plan 598 may comprise more than two recipes and further that the recipes 600 and 608 may comprise more than 3 cooking steps respectively.

Meal plan 598 includes a countdown timeline 616 in minutes that indicates when a task must be started and ended in order to complete the recipes 600, 608 at or before the completion or finish time 618. By adding up the base time of each task of each recipe 600, 608 the total time required for completing of each recipe can be determined. For example, recipe 600 requires the completion of first task 602 (base time 10 minutes)+second task 604 (base time 30 minutes) and third task 606 (base time 10 minutes). This totals 50 minutes so recipe 602 must be started at −50 minutes before the completion time 618. Similarly, recipe 608 requires the completion of the first task 610 (base time 7 minutes)+second task 612 (base time 21 minutes) and the third task 614 (base time 12 minutes). This totals 40 minutes so recipe 608 must be started at −40 minutes before the completion time 618 in order to be completed at the same time as the completion of recipe 600.

This means the person preparing the meal according to meal plan 598 should start with the first task 602 of recipe 600. As clearly shown in meal plan 598, it is not possible to do the first task 602 of recipe 600 and the first task 610 of recipe 608 at the same time because the combined work intensity would be 150% which is higher than 100%. Because there is a conflict of the total work intensity between, for example, first task 602 (work intensity 75%) of recipe 600 with task 610 (work intensity 75%) of recipe 608, task 610 of the second recipe 608 is delayed to start after the completion of task 602 of recipe 600, as explained below. The conflict may be characterized by when it occurs in relation to the meal completion time 618 and also how long in time the conflict is. If it turns out that the total minimum time of the subsequent tasks of recipe 608 is too long in order to complete recipe 608 on or before the finish time 618 on the countdown timeline 616, it is possible to delay the finish time 618 so that the subsequent tasks of recipe 608 can be completed at or before the finish time 618. In such a case the user is warned that the meal finish time is delayed. It is also possible to extend the subsequent tasks after the identified conflict for recipe 600 so that the start time of recipe step 602, and therefore also the finish time of recipe step 602, is advanced so that the conflict is avoided. Another option is to minimize the conflict time by urging the user to speed up the cooking process and thereby complete the conflicting tasks closer to the minimum time of the conflicting cooking steps or tasks. The control unit 110 optimizes the tasks and the order of the tasks for both recipes 600, 608 so that recipe 608 is completed about the same time as the completion of recipe 600 while maintaining the total work intensity below 100%. The control unit 110 then determines the time flexibility of the subsequent tasks in the recipes to see if the base times can be shortened (while not being shorter than the minimum time set for each task) such that both recipes can be completed at about the same time i.e. so that none of the recipes exceeds the maximum total time that are set to complete both recipes. The total minimum time for the subsequent tasks is compared between the two recipes and the control unit selects 110 the next task for the recipe with the highest total minimum time, as explained below.

It is also possible to prioritize tasks so that when two tasks are done simultaneously, the task that has the lower work intensity task such as a task that requires 5% work intensity is started just before the start of a high work intensity task such as a task that requires 75% work intensity. In this way, each minute or time interval on the countdown timeline 616 assigns a task to the chef along the time line 616 until both recipes 600, 608 are completed at the finish time 618. In operation, a portion of the method of the present invention may be described by the steps below:

1. The control unit 110 retrieves the recipes required for a meal from the database 120 and determines total base time for the required tasks for each of the two recipes i.e. recipe 600 and recipe 608. This is illustrated in FIG. 6.
2. The control unit 110 selects and gives priority to the recipe with the longest base time, such as recipe 600.
3. The control unit 110 determine if tasks from recipes 600 and 608 can be done simultaneously by adding the work intensity for each task along a countdown timeline 616 so that both recipes are completed at the desired finish time 618. This means the control unit 110 starts with the desired finish time 618 and works backward to determine the desired start time 617.
4. When the sum of the work intensity exceeds 100% at any period on the countdown timeline 616 there is a conflict because the maximum combined work intensity is set to never exceed 100%. When there is a conflict of the work intensity, the control unit 110 then determines the total minimum time for the remaining tasks for each of recipe 600 and recipe 608 that follows the first task 602 of recipe 600 and the first task 610 of recipe 608. In other words, the control unit 110 determines the total minimum time by adding up the total minimum times for second task 604 and third task 606 of recipe 600 and by adding up the total minimum times for the second task 612 and the third task 614 of recipe 608.
5. In a comparison unit 734 (shown in FIG. 8), the total minimum times of the remaining tasks in step 4 are compared to one another when unit 734 received a compare or control signal 736 from control unit 110 to determine which recipe has the longest minimum time of the remaining tasks. The comparison unit 734 sends back a result or control signal 738 to the control unit 110. Based on the result of the result or control signal 738, the control unit 110 then selects the next task of the recipe with the highest or longest minimum time after the first task has been completed. In this example the total minimum time for tasks 604 and 606 is (20+8) 28 minutes while the total minimum time for tasks 612 and 614 is (3+2) 5 minutes. Because the total minimum time for recipe 600 is greater than the minimum time for recipe 608, the control unit 110 selects task 604 as the next step when preparing the task order of the meal plan 598.
6. The control unit 110 then determines the sum of the total work intensity of task 604 of recipe 600 and task 610 of recipe 608. In this example, the total work intensity of task 604 (20% work intensity) and task 610 (75% work intensity) is 95% which is lower than 100% so step 7a below applies.

7a. When the total work intensity in step 6 is lower than 100% then the comparison unit 734 compares the work intensity of task 604 with the work intensity of task 610 as required by compare signal 736 and sends back the result signal 738. Based on the result of the result signal 738, the control unit 110 gives priority to the task that has the lowest work intensity. In this example, task 604 has a lower work intensity than task 610 so control unit 110 starts task 604 before task 610.

7b. When the total work intensity in step 6 is greater than 100% then the control unit 110 determines the total minimum time for the remaining tasks for each of recipe 600 and recipe 608, as described in step 4. The comparison unit 734 then compares the minimum times for both recipes and sends the report signal 738 back to the control unit 110. The control unit 110 selects the task of the recipe that has the longest total minimum time of the remaining tasks. In this example, there is no remaining work intensity conflict because the combined work intensity remains at or below 100%

Steps 4-7 are iterated until all the tasks of recipe 600 and the tasks of recipe 608 have been determined, as best shown in FIG. 7. In this particular example, it was determined, based on the above method, that the person preparing the meal plan 598 should do the steps in the following order:

1. Recipe 600, first task 602;
2. Recipe 600, second task 604;
3. Recipe 608, first task 610;
4. Recipe 608, second task 612;
5. Recipe 608, third task 614; and
6. Recipe 600, third task 606.

The means that the person who is preparing the meal according to the meal plan 598 should follow the above-outlined work order of six steps in chronological order in order to complete both recipes about the same time at the finish time 618 so that the two recipes 600, 608 can be served together as a meal. The resulting composed time interval structure supplies the user with an optimized step-by-step cooking plan which states that the total work intensity is realistic to perform by a single user and also that the food will maintain the desired quality since the optimized cooking schedule does not exceed 100% combined work intensity and that no time interval (expressed as the time between minimum and maximum time limits) is exceeded for any of the recipe cooking steps in the meal plan.

Figure 8:
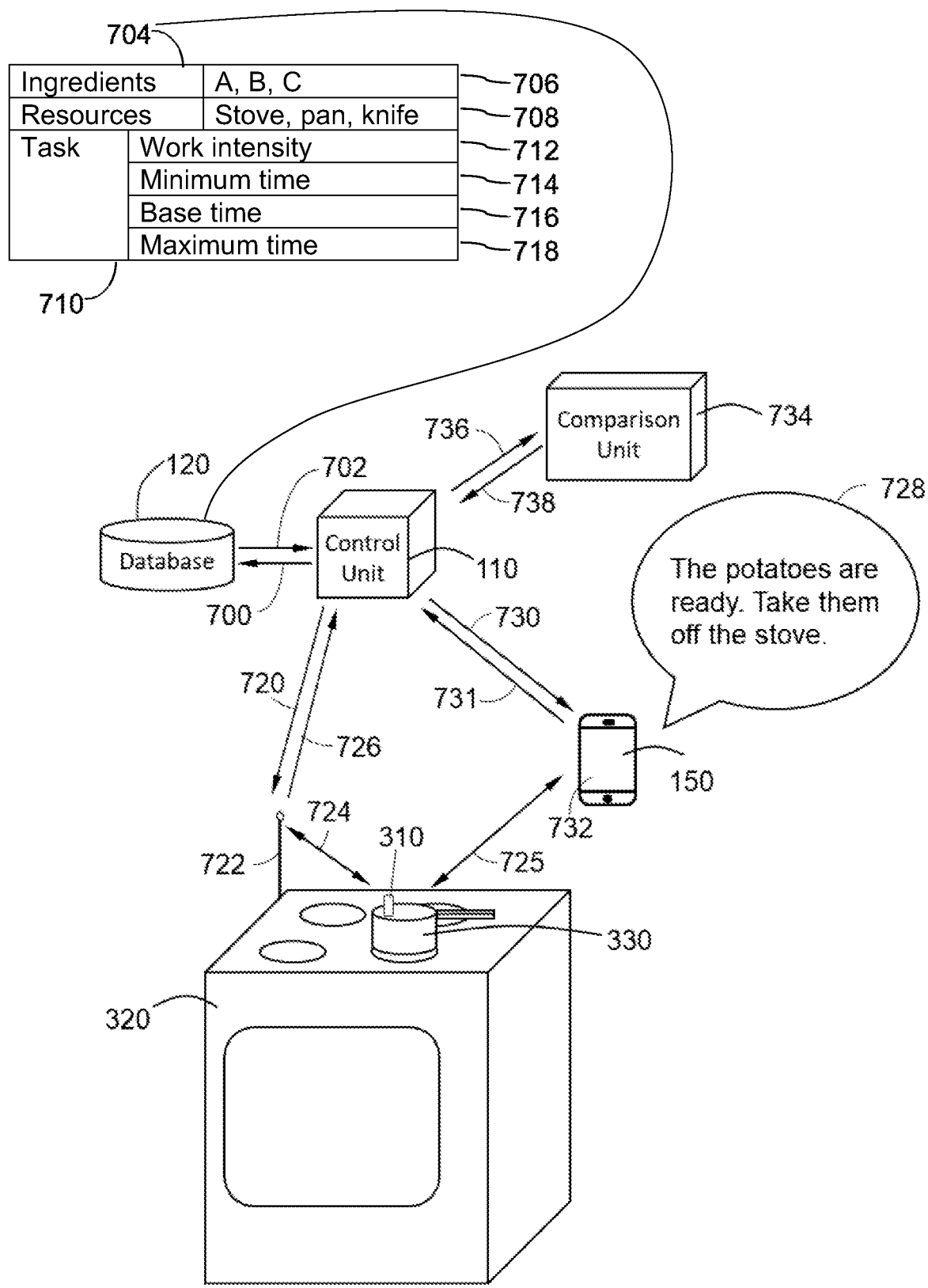
FIG. 8 is a schematic illustration of system of the present invention showing how signals are sent between components of the system.

With reference to FIG. 8, the control unit 110 sends a retrieve signal 700 to a database 120 to retrieve the first recipe 600 and the second 608 because they are required according to meal plan 598. It should be understood that the calculations and logic may be performed in the control unit, the database, the user's communication device or any other device. The database 120 sends back a response signal 702 that includes the first recipe 600 and the second recipe 608. An important feature of the present invention is that all recipes stored in database 120 are stored in a first format 704. The first format 704 includes segments for the ingredients 706, the resources required 708, the cooking steps/tasks 710 wherein each task requires input regarding the work intensity 712, the minimum time 714 required to complete the task, the base time 716 and the maximum time 718 allowed to complete the task. This means the person creating the recipe is required to provide all the input for each recipe so that all the recipes can be stored in the same format 704. The first recipe 600, the second recipe 608 and all other recipes in database 120 are thus stored in format 704.

The control unit 110 may be in communication with the cooking device 320 (such as a stove or any other suitable cooking device or equipment) and/or appliance/appliances 330 (such as a pan or any other suitable appliance) via a communication signal 720 and antenna 722, that in turn, is in communication, via a wireless signal 724, with a sensor 310 that senses the temperature and other parameters of appliance or pan 330. The sensor 310 may also communicate directly with the communication device 150 via a wireless signal 725 so that the sensor 310 sends information directly to the device 150 and receives information from the device 150 instead of or in addition to the control unit 310. When the stove 320 is activated an activation signal 726 is sent from the stove 320 via antenna 722 to the control unit 110. In this way, the control unit 110 may monitor the activity of the stove such as the temperature of the pan 330. The system may also be automatic so that signals such as starting, finishing and alarm signals are automatically sent to and from the control unit 110. The activation and de-activation of the stove 320 in activation signal 726 indicates when a task has started and ended. It is also possible to give control signals when a sensor value is approached, reached or exceeded. The control unit 110 can thus monitor the start time and finish time of the various tasks along the timeline 616. Upon completion of a task, the control unit 110 sends a message 728 via a wireless signal 730 to a display unit 732 which may be part of a communication device 150 such as a smart-phone. The message 728 may include an instruction about what the person preparing the meal according to meal plan 598 should do. This includes instructions about which tasks and in which order the tasks for each recipe should be started and finished.

Additionally, there is also interaction between the control unit 110 and the communication device 150 in that the user of the device 150 must enter a desired finish time 618 that is sent to the control unit 110 via a return signal 731. Another example of interaction between the user of the device 150 and the control unit 110 is that the user may indicate the start or completion of a cooking step or task. The control unit 110 then calculates whether it is possible to complete both recipes by the finish time 618 by adding up all the minimum times and/or base times of each task of recipe 600 and separately adding up all the minimum times and/or base times of each task of recipe 608. A warning signal 730 is sent to the communication device 150 if there is not enough time to complete the recipes before the completion time 618. When it is possible to complete both recipes on or before the finish time 618 the control unit 110 determines a desirable start time 617 by going through the analysis of steps 1-7 described above. The start time 617 is then sent to the communication device 150 so that the user knows when to start preparing the meal 598.

The logic or steps of the present invention may be described or summarized, as shown below:

1. Retrieve recipes from the database;
2. Summarize the work intensity for all overlapping cooking steps;
3. Identify time intervals where the work intensity exceeds 100%;
4. As a first attempt, the control unit identifies the recipe with the cooking step having the last starting time in the conflict (i.e. the cooking step causing the conflict such as first cooking step in recipe 608 in the example shown in FIG. 6) and then the control unit determines how much this cooking step can be delayed by using the time buffer between the set base times of the remaining cooking steps in recipe 608 after the conflict and the minimum time for the cooking steps in this recipe;
5. If the time buffer is larger than the identified conflicting time interval, then the control unit decreases the base time of these cooking steps to resolve the conflict (as was done for recipe 608 in FIG. 7);
6. If the time buffer is less than the identified conflicting time interval, then some more time has to be found by adding time to the remaining cooking steps for the other recipe in the conflict (i.e. the one with the cooking step having the first starting time in the conflict, recipe 600 in FIG. 6, and cooking steps 604 and 606) and then the control unit increases the base time for these cooking steps of this recipe;
7. Then the control unit iterates this sequence (3-6) until there are no longer any conflicting time intervals for overlapping cooking steps having a combined work intensity exceeding 100%. This may be called an optimized cooking schedule;
8. The optimized cooking schedule is then turned into a composed time interval structure containing a list of cooking steps in a sequence where a cooking step having a low work intensity is prioritized before a cooking step having a high work intensity in the case two cooking steps should be started at the same time;
9. The composed time interval structure is the sent to the user's communication device and/or to a cooking device;
10. The method may also include the step of receiving at least one input signal from either a sensor or the user's communication device that cause the control unit to recalculate the composed time interval structure to an adapted time interval structure based on the input signal. There is thus an interactivity between the control unit and the communication device so that the control unit may receive input from sensors in cooking devices and then adapt the time interval structure based on these input signals, and.
11. Finally, the adapted time interval structure is sent to the user's communication device.

The optimized cooking schedule may be defined as a state where the control unit has solved all resource conflicts. The composed time interval structure may be defined as a primary listing of cooking steps that is valid until there is a new input from the user and/or a sensor. The adapted time interval structure may be defined as an adapted listing of cooking steps taking the new input into account.

The described optimization may be performed using iterations, multi variable analysis, convex programming, linear programming, integer programming, quadratic programming, fractional programming, nonlinear programming, stochastic programming, robust programming, heuristics, constraint satisfaction, space mapping, calculus of variation, optimal control, dynamic programming, or any other mathematical model or method.

While the present invention has been described in accordance with preferred compositions and embodiments, it is to be understood that certain substitutions and alterations may be made thereto without departing from the spirit and scope of the following claims.

I claim:

1. A method of cooking a meal, comprising:
providing a cooking device in wireless communication with a control unit, the cooking device being in wireless communication with the control unit, the control unit being in communication with a database, a comparison unit and a communication device;
storing a first cooking recipe in a first format in the database, the first format containing a resource segment, a cooking step or task segment, each cooking step segment containing a work intensity, a minimum time, a base time and a maximum time, the base time being same or longer than the minimum time and same or shorter than the maximum time, the first cooking recipe requiring a first resource and at least a first cooking step and a second cooking step;
storing a second cooking recipe in the first format in the database, the second cooking recipe requiring a second resource and at least a first cooking step and a second cooking step, the first and second cooking recipes being part of a meal;
the communication device sending a request signal to the control unit, the request signal containing a request to plan the meal requiring at least the first cooking recipe and the second cooking recipe and a completion time of the meal;
the control unit sending a retrieve signal to the database to retrieve the first cooking recipe and the second cooking recipe;
the control unit sending a retrieve signal to the communication device to retrieve a completion time of the meal;
the control unit adding up the base times of the first cooking step and the second cooking step of the first cooking recipe to determine a first total time required to complete the first cooking recipe;
the control unit adding up the base times of the first cooking step and the second cooking step of the second cooking recipe to determine a second total time required to complete the second cooking recipe;
the control unit determining a starting time based on the first total time, the second total time and the completion time;
the control unit adding up the work intensity of timewise overlapping cooking steps from the first recipe and the second recipe to a combined work intensity for preparing the meal;
when the first combined work intensity for the first cooking step of the first recipe and the first cooking step of the second recipe exceeds 100%, the control unit sending a control signal to the comparison unit to compare the starting time of the first cooking step of the first recipe with the starting time of the first cooking step of the second recipe and to select the recipe with the first cooking step having an earliest starting time, the comparison unit sending a control signal to the control unit to advance the completion time of the first cooking step for the selected recipe having the earliest starting time for the first cooking step and to delay the starting time of the first cooking step for the recipe having the latest starting time of the first cooking step;
the control unit iteratively advancing the completion time of the first cooking step for the selected recipe with the earliest starting time by reducing the base time for this cooking step and increasing the base time for the second cooking step of the selected recipe and delaying the starting time of the first cooking step for the recipe with the latest starting time by reducing the base times of the first cooking step and the second cooking step for this recipe until the combined work intensity no longer exceeds 100%;
when the first combined work intensity for the first cooking step of the first recipe and the first cooking step of the second recipe exceeds 100% and all minimum time limits and all maximum time limits are reached, the control unit sending a message to the communication unit to choose a new combination of recipes for the meal;

when the combined work intensity remains at a maximum 100% from the starting time to the completion time, the control unit prioritizing the cooking steps having a lowest work intensity when two or more cooking steps are scheduled to start at the same time;

the control unit generating and transmitting control signals to the communication device of the user or to a cooking device for outputting the composed time interval structure on the communication device and/or the cooking device;

the control unit receiving at least one input value from a sensor or from the communication device;

the control unit generating and transmitting control signals to the communication device in response to the input value from the sensor for outputting the adapted time interval structure on the communication device and/or the cooking device.

2. The method according to claim 1 wherein the method further comprises the step of the control unit sending a comparison signal to the comparison unit to compare the work intensity of the second cooking step of the first cooking recipe with the first cooking step of the second cooking recipe, the control unit sending an instruction signal to the communication device to start the second cooking step of the first cooking recipe before the first cooking step of the second cooking recipe when the second cooking step of the first cooking recipe has a work intensity lower than the work intensity of the first cooking step of the second cooking recipe.

3. The method according to claim 1 wherein the method further comprises the step of providing a sensor on the cooking device, the sensor sensing a temperature on the cooking device, the sensor sending a temperature signal to the control unit when the temperature approaches, reach or exceeds a threshold value.

4. The method according to claim 3 wherein the method further comprises the step of the control unit receiving the temperature signal at a first time and comparing the first time to a reference time on a countdown timeline, the control unit sending a warning signal to the communication device when the first time is later than the reference time.

5. The method according to claim 4 wherein the method further comprises the step of the control unit receiving the temperature signal at a first time and comparing the first time to a reference time for completing a cooking step and sending a warning signal to the communication device when the first time exceeds a maximum time set for the cooking step.

6. The method according to claim 1 wherein the method further comprises the step of starting a cooking step of the first cooking recipe before a cooking step of the second cooking recipe when the cooking step of the first cooking recipe has a work intensity that is lower than the work intensity of the cooking step of the second cooking recipe.

7. The method according to claim 1 wherein the method further comprises the step of the sensor sending information signals directly to the communication device.

8. The method according to claim 1 wherein the method further comprises the step of the control unit comparing resources required for the first cooking recipe with the resources required for the second cooking recipe, further identifying and resolving a conflict in resource utilization.

9. The method according to claim 1 wherein the method further comprises the step of the control unit adjusting an permitted preparation time of cooking steps so that the first and second cooking recipes are completed at the same time.

10. The method according to claim 1 wherein the method further comprises the step of the control unit displaying each subsequent cooking step of the first and second cooking recipe along the countdown timeline so that a second cooking step of the first cooking recipe and the second cooking step of the second cooking recipe are simultaneously completed.

* * * * *